(12) United States Patent
Purreiter et al.

(10) Patent No.: US 12,297,887 B2
(45) Date of Patent: May 13, 2025

(54) BUSH

(71) Applicant: DTR VMS Limited, Trowbridge (GB)

(72) Inventors: Christoph Purreiter, Munich (GB); Jonathan Morton, Mendig (GB); Jan Geisen, Mendig (GB); Peter Simms, Trowbridge (GB); Hamid Mir, Troy, MI (US)

(73) Assignee: DN Automotive Germany GmbH (DE)

( * ) Notice: Subject to any disclaimer, the term of this patent is extended or adjusted under 35 U.S.C. 154(b) by 285 days.

(21) Appl. No.: 17/765,878

(22) PCT Filed: Sep. 29, 2020

(86) PCT No.: PCT/EP2020/077237
§ 371 (c)(1),
(2) Date: Apr. 1, 2022

(87) PCT Pub. No.: WO2021/063949
PCT Pub. Date: Apr. 8, 2021

(65) Prior Publication Data
US 2022/0364625 A1    Nov. 17, 2022

(30) Foreign Application Priority Data
Oct. 3, 2019 (GB) .................................. 1914271

(51) Int. Cl.
*F16F 7/10* (2006.01)
*B60K 5/12* (2006.01)
*F16F 7/108* (2006.01)

(52) U.S. Cl.
CPC ............ *F16F 7/108* (2013.01); *B60K 5/1208* (2013.01); *B60K 5/1291* (2013.01);
(Continued)

(58) Field of Classification Search
CPC .................. F16F 7/108; F16F 2222/08; F16F 2224/0208; F16F 2224/025;
(Continued)

(56) References Cited

U.S. PATENT DOCUMENTS

| 4,392,640 A * | 7/1983 | Kakimoto | F16F 1/377 |
| | | | 267/141.2 |
| 4,403,762 A * | 9/1983 | Cogswell, II | F16F 7/108 |
| | | | 188/379 |

(Continued)

FOREIGN PATENT DOCUMENTS

| CN | 102465989 B | 3/2014 |
| DE | 19606155 B4 | 12/2004 |

(Continued)

OTHER PUBLICATIONS

Dec. 23, 2024 Office Action from corresponding EP application 207859422.

*Primary Examiner* — Robert A. Siconolfi
*Assistant Examiner* — James K Hsiao
(74) *Attorney, Agent, or Firm* — McGarry Bair PC

(57) ABSTRACT

Various embodiments provide a bush for isolating vibrations, the bush comprising: a first anchor part defining a longitudinal axis; a second anchor part disposed coaxially with respect to the first anchor part; a first resilient body operably engaged with the first anchor part; a second resilient body operably engaged with the second anchor part; and an inertial mass element disposed between the first anchor part and the second anchor part. The inertial mass element is independently connected to the first resilient body and the second resilient body. Also, the first resilient body, second resilient body and inertial mass element are arranged to isolate vibrations between the first anchor part and the second anchor part within a predetermined operational frequency range. Further, the inertial mass element is arranged
(Continued)

to isolate the first anchor part and second anchor part from dynamic stiffness increases associated with eigenmodes of the first resilient body and the second resilient body in the predetermined operational frequency range.

21 Claims, 12 Drawing Sheets

(52) U.S. Cl.
CPC ... *F16F 2222/08* (2013.01); *F16F 2224/0208* (2013.01); *F16F 2224/025* (2013.01); *F16F 2228/007* (2013.01); *F16F 2230/007* (2013.01); *F16F 2230/36* (2013.01); *F16F 2234/02* (2013.01)

(58) Field of Classification Search
CPC ........... F16F 2228/007; F16F 2230/007; F16F 2230/36; F16F 2234/02; B60K 5/1208; B60K 5/1291
See application file for complete search history.

(56) References Cited

U.S. PATENT DOCUMENTS

| | | | | | |
|---|---|---|---|---|---|
| 4,667,942 | A | * | 5/1987 | Bitschkus | F16F 1/387 267/121 |
| 4,786,036 | A | | 11/1988 | Kanda | |
| 4,869,475 | A | | 9/1989 | Bouhier | |
| 4,889,328 | A | * | 12/1989 | Uno | F16F 13/22 267/293 |
| 5,156,380 | A | * | 10/1992 | Cerruti | F16F 7/108 267/140.3 |
| 5,286,011 | A | * | 2/1994 | Strand | F16F 13/20 267/219 |
| 5,687,948 | A | * | 11/1997 | Whiteford | F16F 1/3814 267/140.13 |
| 5,725,202 | A | * | 3/1998 | Nakamura | F16F 1/3835 267/219 |
| 5,842,687 | A | * | 12/1998 | David | F16F 1/3863 267/153 |
| 6,065,742 | A | * | 5/2000 | Whiteford | F16F 7/108 267/141.5 |
| 6,318,708 | B1 | * | 11/2001 | Wolf | F16F 9/3415 267/140.12 |
| 6,755,405 | B2 | * | 6/2004 | Kammel | F16F 1/3842 267/141.1 |
| 7,267,740 | B2 | * | 9/2007 | Yasumoto | F16F 7/108 29/896.93 |
| 7,866,639 | B2 | * | 1/2011 | Endo | F16F 13/14 267/219 |
| 9,506,517 | B2 | * | 11/2016 | Cha | F16F 1/3863 |
| 9,512,893 | B2 | * | 12/2016 | Yahata | F16F 1/3849 |
| 9,528,566 | B2 | * | 12/2016 | Schnaars | F16F 13/16 |
| 9,546,705 | B2 | * | 1/2017 | Ishimatsu | F16F 1/3835 |
| 10,145,442 | B2 | * | 12/2018 | Ditzel | F16F 13/1463 |
| 10,184,512 | B2 | * | 1/2019 | Palluck | F16C 33/64 |
| 10,415,666 | B2 | * | 9/2019 | Nishi | F16F 1/3835 |
| 10,611,227 | B2 | * | 4/2020 | Kim | F16F 13/10 |
| 2003/0137088 | A1 | | 7/2003 | Hadi et al. | |
| 2005/0253317 | A1 | * | 11/2005 | Yasumoto | F16F 7/108 267/140.11 |
| 2006/0261531 | A1 | | 11/2006 | Kim | |
| 2007/0210534 | A1 | * | 9/2007 | Thibault | F16F 1/3807 16/2.1 |
| 2014/0210148 | A1 | * | 7/2014 | Eguchi | F16F 1/3828 267/141 |
| 2015/0323031 | A1 | * | 11/2015 | Yahata | F16F 1/3863 267/141.2 |
| 2018/0087567 | A1 | * | 3/2018 | Palluck | F16C 33/64 |

FOREIGN PATENT DOCUMENTS

| | | |
|---|---|---|
| EP | 0410941 B1 | 9/1994 |
| EP | 1035349 B1 | 1/2005 |
| FR | 2555688 B1 | 3/1988 |
| WO | 2019197294 A1 | 10/2019 |

* cited by examiner

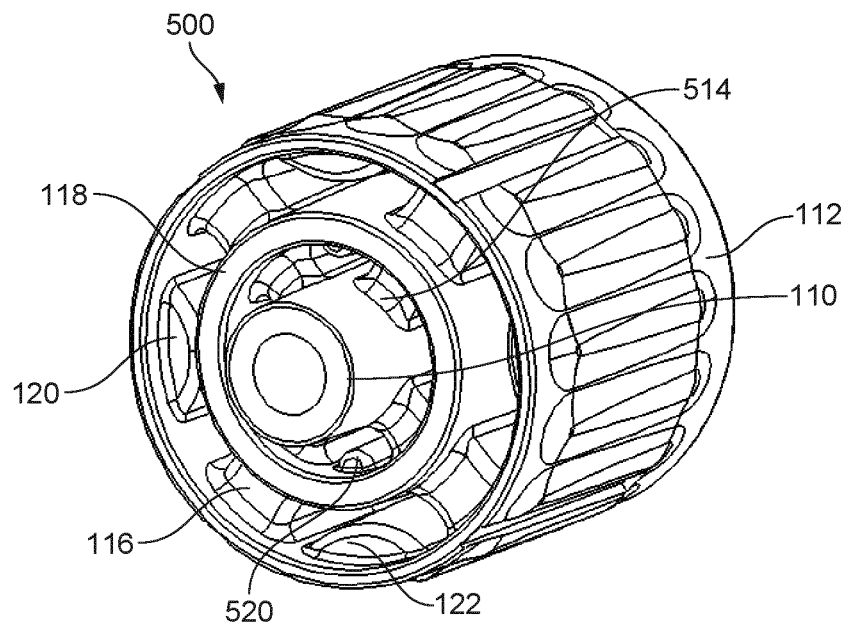
FIG. 7
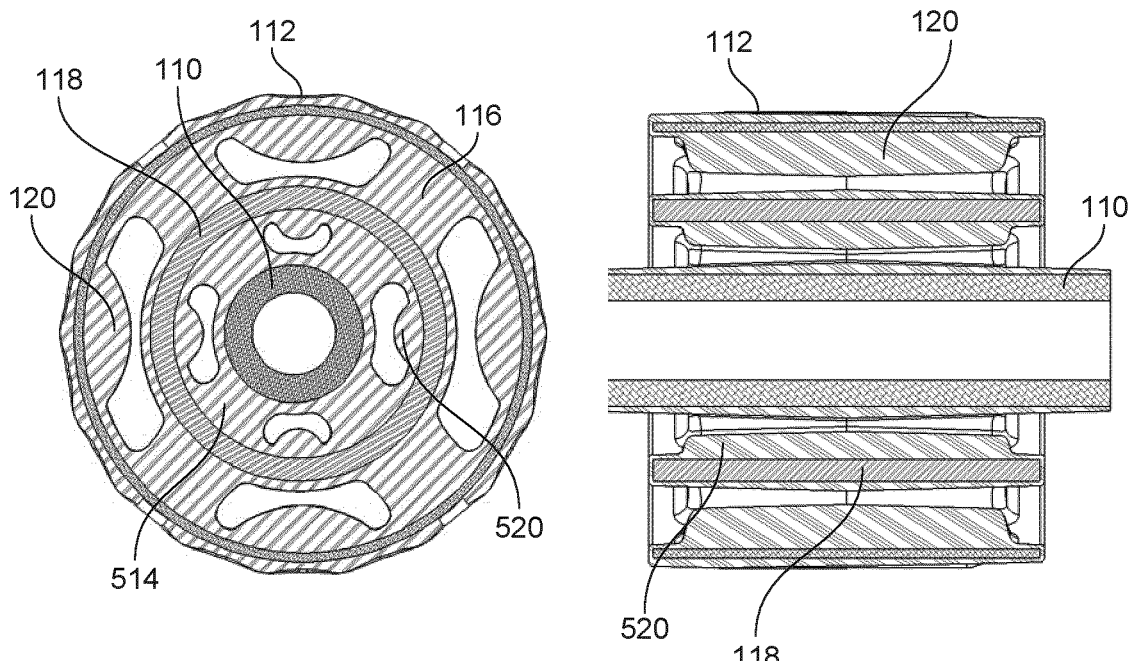
FIG. 8A
FIG. 8B

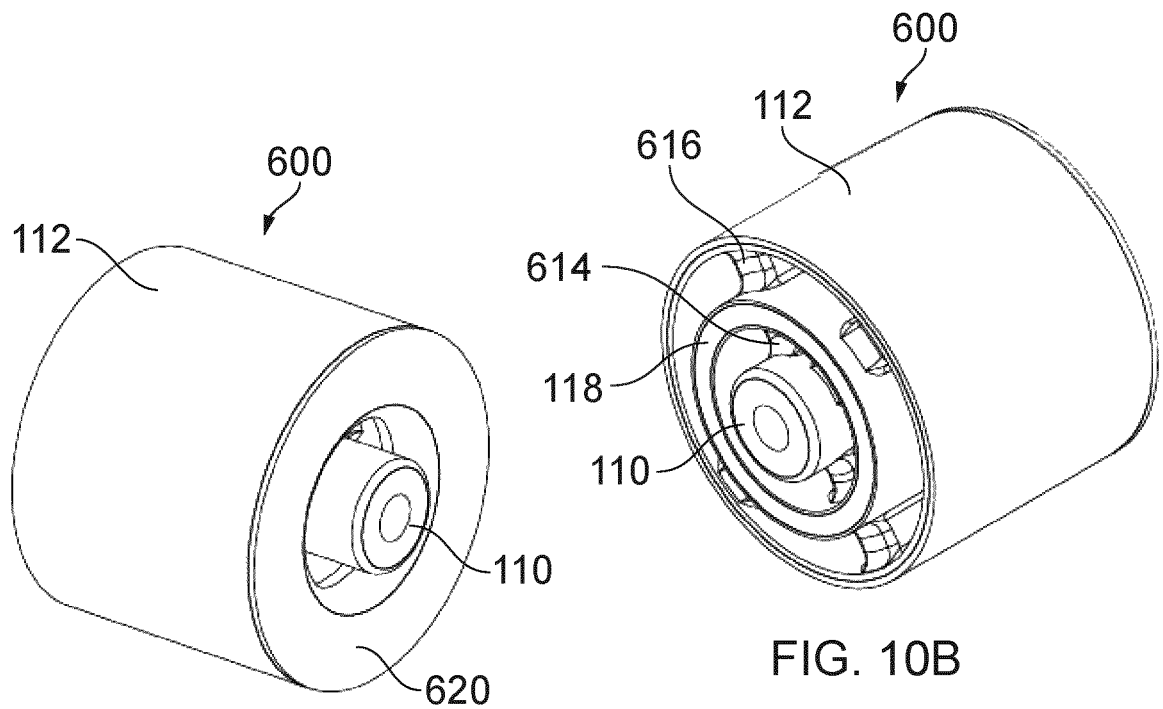
FIG. 10A
FIG. 10B
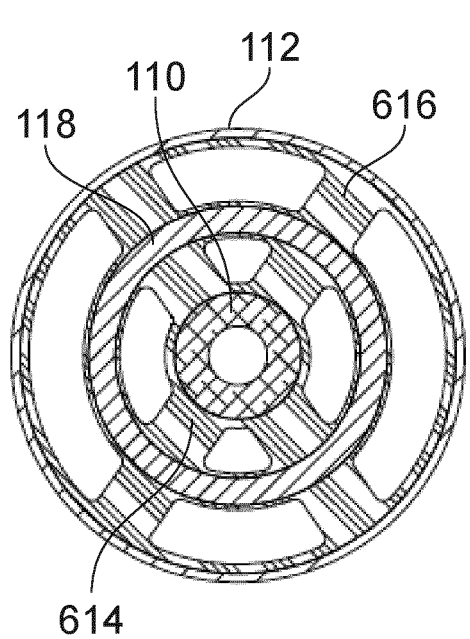
FIG. 10C
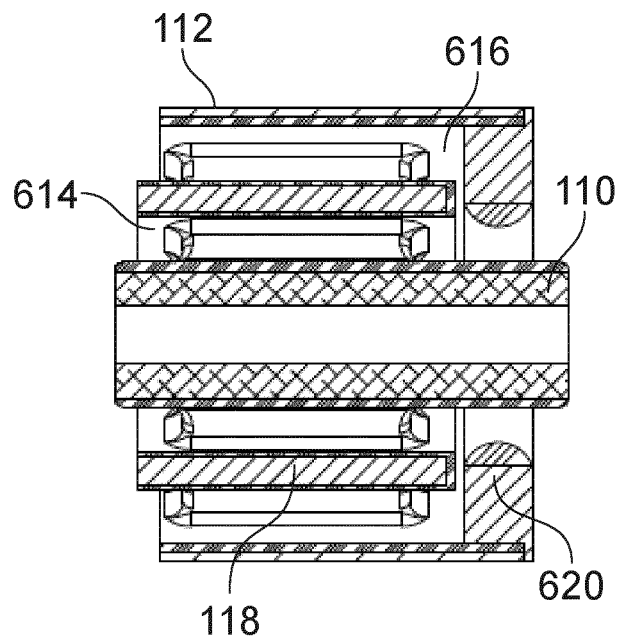
FIG. 10D

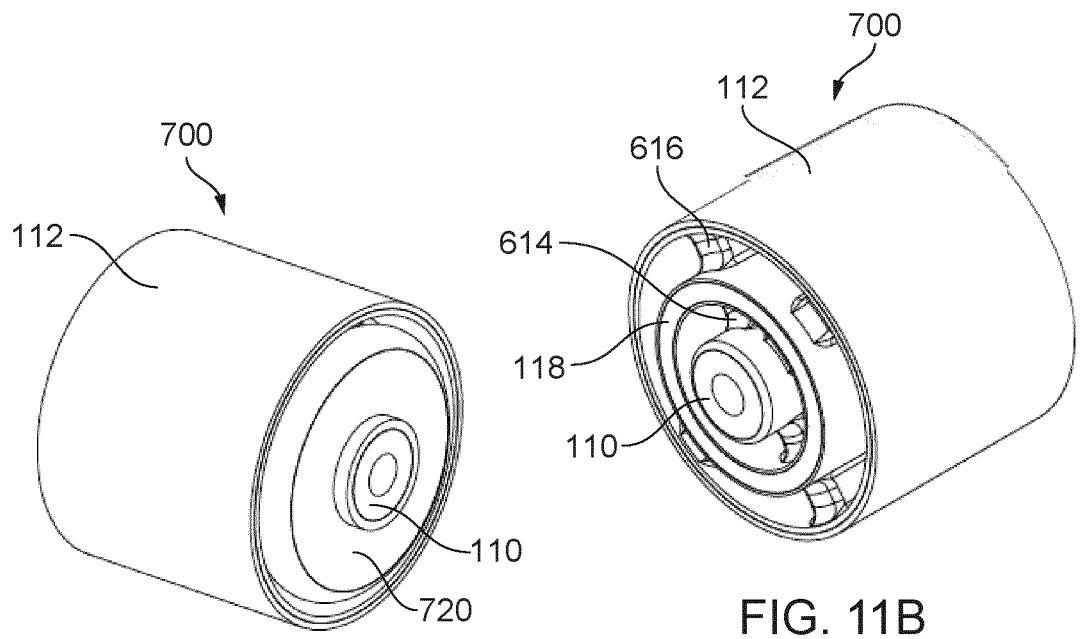
FIG. 11A
FIG. 11B
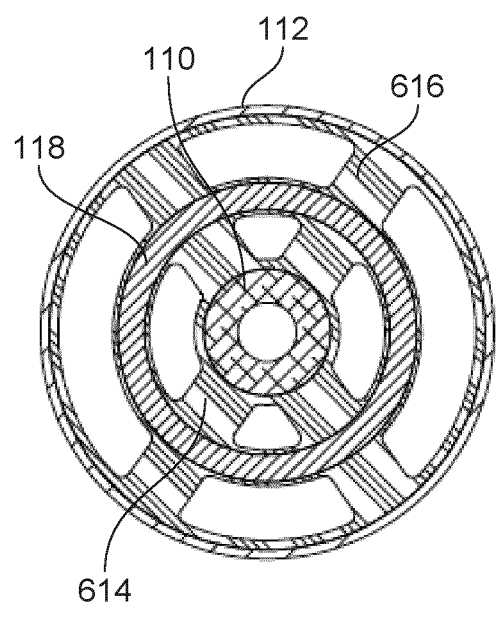
FIG. 11C
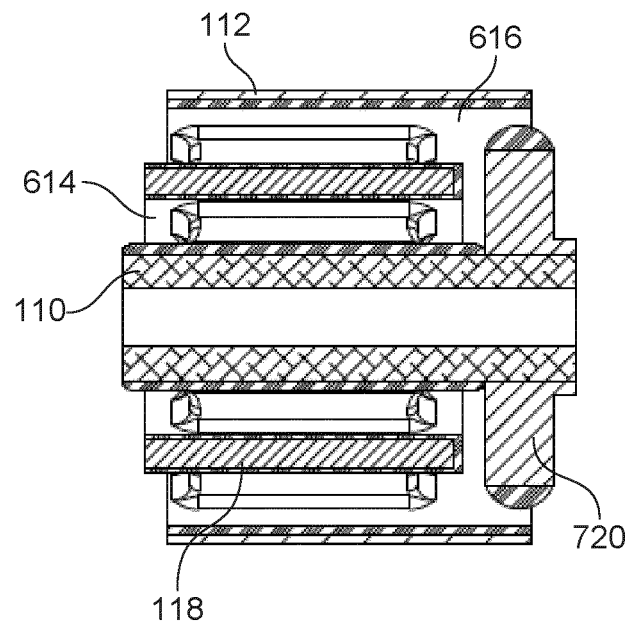
FIG. 11D

BUSH

CROSS-REFERENCE TO RELATED APPLICATIONS

This application is a U.S. National Phase application of International Application No. PCT/EP2020/077237, filed on 29 Sep. 2020; which claims priority of GB 1914271.0, filed on 3 Oct. 2019, all of which are incorporated herein by reference in their entirety.

FIELD OF THE INVENTION

The invention relates to a bush for resisting vibrations between two components, such as the engine and chassis of a vehicle.

BACKGROUND TO THE INVENTION

Typically a bush for resisting vibration comprises two anchor parts that are connected by resilient material, such as rubber. One anchor part is attached to one component of the vibrating machinery, and the other anchor part attached to another component. As the two components vibrate relative to each other, the resilient material to provide isolation between vibrating component and anchor. Such bushes thus permit some relative movement, but act to prevent excessive movement between components.

GB 2 364 558 discloses an example of a bush, in which the anchor part for one component of the vibrating machinery is in the form of a hollow sleeve and the other anchor part in the form of a rod or tube extending approximately centrally and coaxially of the sleeve. A resilient body, e.g. of rubber or other suitable elastomeric material, is disposed within an annular volume between the sleeve and the rod. The resilient body can be secured in place, e.g. by radial crimping of the sleeve towards the rod or by bonding via a vulcanisation process.

The resilient body between the sleeve and the rod represents a spring element for isolating vibration. The dynamic stiffness of this spring element varies with vibration frequency depending on a number of factors, including the resilient material used, and the shape and configuration of the connection between the sleeve and rod. However, in any given arrangement, the resilient body will exhibit one or more eigenmodes where the dynamic stiffness increases and the vibrational isolation between the interconnected components is reduced.

It is desirable for the eigenmodes of the resilient body to lie outside a frequency range associated with normal operation of the components to be interconnected (e.g. engine and chassis in a vehicle).

SUMMARY OF THE INVENTION

At its most general the present invention provides a bush having an inertial mass within a resilient interconnection between two anchor parts in order to provide a flat dynamic stiffness profile within a predetermined operational vibration frequency range. The predetermined operational vibration frequency range may be a sensitive vibration frequency range, e.g. associated with vibration frequency that may be expected to occur regularly or for extending periods during operation. For example, where the bush is connected in a vehicle, the predetermined operational vibration frequency range may be associated with engine vibrations associated with cruising across a range of conventional speeds.

The anchor parts are interconnected by two independent spring elements (e.g. resilient bodies) which are separated by the inertial mass. Properties of the inertial mass and spring elements are selected to ensure that any resonance conditions associated with either of the spring elements or the spring elements and inertial mass in combination lie outside the predetermined operational vibration frequency range, e.g. in a non-sensitive operational vibration frequency range.

The bush may be used in many different applications or environments, for example, the bush may be connected to an internal combustion engine, an electric engine, a hybrid engine, a motor, an electric motor, a gearbox, a differential, or the like.

According to the invention, there is provided a bush for isolating vibrations, the bush comprising: a first anchor part defining a longitudinal axis; a second anchor part disposed coaxially with respect to the first anchor part; a first resilient body operably engaged with the first anchor part; a second resilient body operably engaged with the second anchor part; and an inertial mass element disposed between the first anchor part and the second anchor part, wherein the inertial mass element is independently connected to the first resilient body and the second resilient body, wherein the first resilient body, second resilient body and inertial mass element are arrange to isolate vibrations between the first anchor part and the second anchor part within a predetermined operational frequency range, and wherein the inertial mass element has a mass selected to isolate the first anchor part and second anchor part from dynamic stiffness increases associated with eigenmodes of the inner resilient body and the outer resilient body in the predetermined operational frequency range. In use, the bush may thus exhibit a flat or otherwise generally uniform dynamic stiffness profile across the predetermined operational frequency range.

The term "resilient" is used herein to indicate generally the ability to recoil or spring back after application of a deforming force.

Preferably the inertial mass element occupies a non-resonant condition in the predetermined operational frequency range. In other words, the relative movement of the inertial mass element between the first anchor part and second anchor part may lie within a range that is substantially uniform across the predetermined operational frequency range. A combination of the inertial mass element and first and second resilient bodies may form a system that exhibits resonance. This resonance may be characterised by an increase in the system's dynamic stiffness. This resonant condition (which may be viewed as an oscillation resonance of the inertial mass element) may be at a frequency below the predetermined operational frequency range, e.g. in a non-sensitive operational frequency range at or below 1000 Hz.

For example, if the bush is used in a vehicle, e.g. a vehicle with an electric motor, a non-sensitive operational frequency range that is below a threshold of 1000 Hz can be a good area because electric motors typically generate vibrations at this frequency at relatively low speeds. As such low speeds are not normally maintained for any length of time, a driver would not perceive any noise in this non-sensitive range. In contrast, a high dynamic stiffness due to the resonant condition occurred at higher frequency range, there is a risk of it coinciding with cruising of times spent at a certain speed for long periods of time, which would be noticeable. It is to be understood that in another embodiment, a different threshold could be used, such as, for example, below 500 Hz or between 200 Hz and 800 Hz.

The bush may exhibit a dynamic stiffness characteristic having a single peak at a resonant frequency below the predetermined operational frequency range. The dynamic stiffness characteristic may include a plateau region across the predetermined operational frequency range. The plateau region may be characterised by a variation in dynamic stiffness of less than 1000 N/mm, preferably less than 500 N/mm.

The predetermined operational frequency range may be 500 to 2500 Hz or any sub-range thereof. The bush may be arranged to exhibit a low dynamic stiffness, e.g. less than 100 N/mm, within all or part of the predetermined operational frequency range, e.g. within a range from 1000 to 2000 Hz.

In one example, the first anchor part may be a rod extending along the longitudinal axis. The second anchor part may comprise a sleeve surrounding the rod and defining an annular spacing therebetween. In this example, the inertial mass element may comprise a piece of material, such as a rigid tubular body, disposed in the annular spacing, e.g. coaxially with respect to the rod and the sleeve. The inertial mass element may be retained in this position by the first and second resilient bodies. For example, the first resilient body may extend radially between an outer surface of the rod and an inner surface of the inertial mass element. The second resilient body may extend radially between an outer surface of the inertial mass element and an inner surface of the sleeve.

The first resilient body may be a solid resilient member that fills an annular volume between the rod and the rigid tubular body. Alternatively, the first resilient body may be a moulded resilient member having axially extending passages therethrough to facilitate relative movement between the first and second anchor parts during loading, for example, when the first and/or second anchor parts are loaded during operation.

The second resilient body may be a solid resilient member that fills an annular volume between the sleeve and the rigid tubular body. Alternatively, the second resilient body may be a moulded resilient member having axially extending passages therethrough to facilitate relative movement between the first and second anchor parts during loading, for example, when the first and/or second anchor parts are loaded during operation.

The bush may include one or more snubber portions to physically limit an extent of relative radial movement between the first and second anchor parts. For instance, the first resilient body may include snubber portions formed within its axially extending passages to physically limit the extent of relative radial movement between the first and second anchor parts. Additionally or alternatively, the second resilient body may include snubber portions formed within its axially extending passages to physically limit the extent of relative radial movement between the first and second anchor parts. Additionally or alternatively, at least one of the first and second anchor parts may include one or more snubber portions which physically limit an extent of relative radial movement between the first and second anchor parts. For example, the first anchor part may include a protrusion arranged to abut or impact the second anchor part when a spacing (i.e. distance) between the first and second anchor parts falls below a predefined amount which is defined by a shape/dimension (e.g. radial length) of the protrusion. Alternatively, the second anchor part may include the protrusion. Furthermore, the first anchor part may include a first protrusion and the second anchor part may include a second protrusion, and the first and second protrusions may be arranged to abut or impact each other when a spacing (i.e. distance) between the first and second anchor part falls below a predefined amount which is defined by the combined dimensions (e.g. radial lengths) of the first and second protrusions.

In an embodiment, the first resilient body, second resilient body and inertial mass element together may form a first frustoconical interconnection between the first anchor part and the second anchor part. That is, the first resilient body, inertial mass element, and second resilient body may combine to form a substantially frustroconically-shaped structure which is coaxial with the longitudinal axis, and the frustroconical shape may extend away from the first anchor part, and towards the second anchor part, at the same non-normal angle with respect to the longitudinal axis (e.g. be inclined or sloped with respect to the longitudinal axis). The non-normal angle may be an acute angle, such as, between 15 degrees and 65 degrees, for example, about 40 degrees. Accordingly, the first resilient body may extend away from the first anchor part at a first non-normal angle (e.g. acute angle) with respect to the longitudinal axis. A portion of the first anchor part that is operatively engaged with the first resilient body may include an angled platform or surface, and a normal of a plane of the platform or surface is angled at the first non-normal angle. Also, the second resilient body may extend away from the second anchor part at a second non-normal angle (e.g. acute angle) with respect to the longitudinal axis. A portion of the second anchor part that is operatively engaged with the second resilient body may include an angled platform or surface, and a normal of a plane of the platform or surface is angled at the second non-normal angle. The first and second non-normal angles may be the same angle or different angles. The first frustroconical interconnection may extend from the first anchor part and along the longitudinal axis in either direction (e.g. left or right if the longitudinal axis is horizontal). Stated differently, the first frustroconical interconnection may form either a "<" type shape or a ">" type shape based on a horizontal longitudinal axis. Further, the inertial mass element may include a substantially frustroconically-shaped portion. For example, the inertial mass element may comprise a rigid separating portion, e.g. in the form or a plate or the like, which physically separates the first resilient body from the second resilient body. The rigid separating portion may be an annular planar element extending circumferentially around the bush. A normal of the plane of the planar element may be inclined to the longitudinal axis by, for example, an acute angle, such as, 15-65 degrees, e.g. 40 degrees. Additionally, the inertial mass element may include a substantially cylindrically-shaped portion extending from, and axially aligned with, the substantially frustroconically-shaped portion.

In an embodiment, the first and second resilient bodies 818 and 814 are axially pre-compressed to increase bush durability. The increase in durability comes from pre-compressing the resilient bodies to remove residual stresses caused by the resilient bodies shrinking following manufacture (e.g. moulding). The axial pre-compression may be applied to the first and second resilient bodies 818 and 814 by the angled platforms/surfaces of the first and second anchor parts 110 and 112.

The bush may further include: a third resilient body operably engaged with the first anchor part; a fourth resilient body operably engaged with the second anchor part; and a second inertial mass element disposed between the first anchor part and the second anchor part, wherein the second inertial mass element is independently connected to the third resilient body and the fourth resilient body, wherein the third resilient body, fourth resilient body and second inertial mass element are arranged to isolate vibrations between the first anchor part and the second anchor part within a predetermined operational frequency range, and wherein the second inertial mass element is arranged to isolate the first anchor part and second anchor part from dynamic stiffness increases associated with eigenmodes of the third resilient body and the fourth resilient body in the predetermined operational frequency range.

The above-described further features and advantages of the inertial mass element, first resilient body and second resilient body are hereby restated in respect of the second inertial mass element, third resilient body, and fourth resilient body, respectively.

The third resilient body, fourth resilient body and second inertial mass element together may form a second frustoconical interconnection between the first anchor part and the second anchor part. That is, the third resilient body, second inertial mass element, and fourth resilient body may combine to form a second substantially frustroconically-shaped structure which is coaxial with the longitudinal axis, and the frustoconical shape may extend away from the first anchor part, and towards the second anchor part, at the same non-normal angle with respect to the longitudinal axis (e.g. be inclined or sloped with respect to the longitudinal axis). The non-normal angle may be an acute angle, such as, between 15 degrees and 65 degrees, for example, about 40 degrees. Accordingly, the third resilient body may extend away from the first anchor part at a third non-normal angle (e.g. acute angle) with respect to the longitudinal axis. A portion of the first anchor part that is operatively engaged with the third resilient body may include an angled platform or surface, and a normal of a plane of the platform or surface is angled at the third non-normal angle. Also, the fourth resilient body may extend away from the second anchor part at a fourth non-normal angle (e.g. acute angle) with respect to the longitudinal axis. A portion of the second anchor part that is operatively engaged with the fourth resilient body may include an angled platform or surface, and a normal of a plane of the platform or surface is angled at the fourth non-normal angle. The third and fourth non-normal angles may be the same or different angles. Any two or more of the first to fourth non-normal angles may be the same angle, for example, all four non-normal angles may be the same angle. Further, the second inertial mass element may include a substantially frustroconically-shaped portion. For example, the second inertial mass element may comprise a rigid separating portion, e.g. in the form or a plate or the like, which physically separates the third resilient body from the fourth resilient body. The rigid separating portion may be an annular planar element extending circumferentially around the bush. A normal of the plane of the planar element may be inclined to the longitudinal axis by, for example, by an acute angle, such as, 15 degrees to 65 degrees, for example, about 40 degrees. Additionally, the second inertial mass element may include a substantially cylindrically-shaped portion extending from, and axially aligned with, the substantially frustroconically-shaped portion.

In an embodiment, the third and fourth resilient bodies 824 and 826 are axially pre-compressed to increase bush durability. As was the case with the first and second resilient bodies, the axial pre-compression may be applied to the third and fourth resilient bodies 824 and 826 by the angled platforms/surfaces of the first and second anchor parts 110 and 112.

In an embodiment, the first frustroconical interconnection extends away from the first anchor part, and towards the second anchor part, at the same non-normal angle with respect to the longitudinal axis compared to the second frustroconical interconnection. For example, the first and second frustroconical interconnections may extend at an acute angle (e.g. between 15 degrees and 65 degrees, for example, about 40 degrees). Additionally, the first frustroconical interconnection may extend away from the first anchor part, and towards the second anchor part, in an opposite direction along the longitudinal axis compared to the second frustroconical interconnection. For example, if the bush is orientated so that the longitudinal axis is horizontal, the first frustroconical interconnection may extend away from the first anchor part (and towards the second anchor part) in a right-ward direction whereas the second frustroconical interconnection may extend away from the first anchor part (and towards the second anchor part) in a left-ward direction. Stated differently, if the first frustroconical interconnection is positioned side-by-side with the second frustroconical interconnection, then their resultant cross-sections would form either a "< >" type shape or a "> <" type shape. However, it is to be understood that in some embodiments, the first and second frustroconical interconnections may extend at a different non-normal angle to each other, e.g. the first frustroconical interconnection may extend at 40 degrees, but the second frustroconical interconnection may extend at 45 degrees. Additionally, both the first and second frustroconical interconnections may extend in the same direction along the longitudinal axis, so as to form either a "< <" type shape or a "> >" type shape.

In an embodiment, the first resilient body, second resilient body and inertial mass element are positioned on one side of a snubber portion of an anchor part, and the third resilient body, fourth resilient body and second inertial mass element are positioned on an opposite side of that snubber portion. Alternatively, in another embodiment, the first resilient body, second resilient body and inertial mass element are positioned on one side of a snubber portion of an anchor part, and the third resilient body, fourth resilient body and second inertial mass element are positioned on the same side of that snubber portion. In this latter embodiment, an inertial mass connection element may be is connected on one side to the inertial mass element and on an opposite side to the second inertial mass element so as to form an inertial mass assembly. That is, the two inertial mass elements may be joined together so as to form a single structure which moves as one.

In another example, the first anchor part may be a boss element and the second anchor part may be a cup element arranged to receive the boss element therein. The boss element may be an elongate, e.g. rod-like, structure extending along the longitudinal axis of the bush. The cup element may be a generally cylindrical structure that defines a cavity within which the boss element is receivable. In this example, the first resilient body, second resilient body and inertial mass element may together form a frustoconical interconnection between the boss element and the cup element. The inertial mass element may comprise a rigid separating portion, e.g. in the form or a plate or the like, which physically separates the first resilient body from the second resilient body. The rigid separating portion may be an annular planar element extending circumferentially around the bush. A normal of the plane of the planar element may be inclined to the longitudinal axis.

The inertial mass element may comprise a snubber portion for limiting relative axial movement between the boss element and the cup element. The snubber portion may comprise a radially extending surface, e.g. plate, that is arranged to abut either the cup element or boss element if relative movement therebetween exceeds a threshold. For example, the cup element may comprise a top flange arranged to abut the snubber portion to restrict an axial distance by which the boss element is movable into the cup element.

In use, the first anchor part may be connected to a first machine component and the second anchor part may be connected to a second machine component, whereby the bush is operable to isolate vibrations between the first machine component and second machine component. In an embodiment, both the first and second machine components may vibrate; however, in at least some other embodiments either the first or the second machine component may be fixed (i.e. cannot vibrate). The bush may be configured for use in any suitable field. For example, the first machine component and second machine component are the engine and chassis of a vehicle.

BRIEF DESCRIPTION OF THE DRAWINGS

Embodiments of the invention are discussed in detail with reference to the accompanying drawings, in which:

FIG. 7 is a perspective view of a bush that is a further embodiment of the present invention;

FIGS. 8A and 8B show cross-sectional views of the bush of FIG. 7;

FIG. 10A is a perspective view of a first end of a bush that is another further embodiment of the present invention;

FIG. 10B is a perspective view of a second end of the bush of FIG. 10A;

FIGS. 10C and 10D show cross-sectional views of the bush of FIG. 10A;

FIG. 11A is a perspective view of a first end of a bush that is yet another further embodiment of the present invention;

FIG. 11B is a perspective view of a second end of the bush of FIG. 11A;

FIGS. 11C and 11D show cross-sectional views of the bush of FIG. 11A;

DETAILED DESCRIPTION OF THE DRAWINGS

Figure 1:
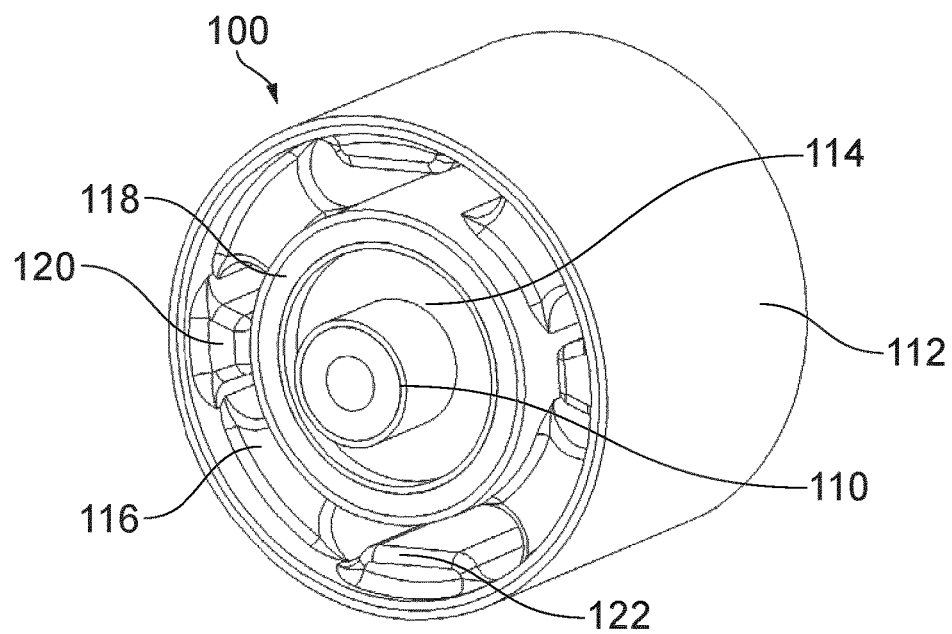
FIG. 1 is a perspective view of a bush that is an embodiment of the present invention.
Figure 2A:
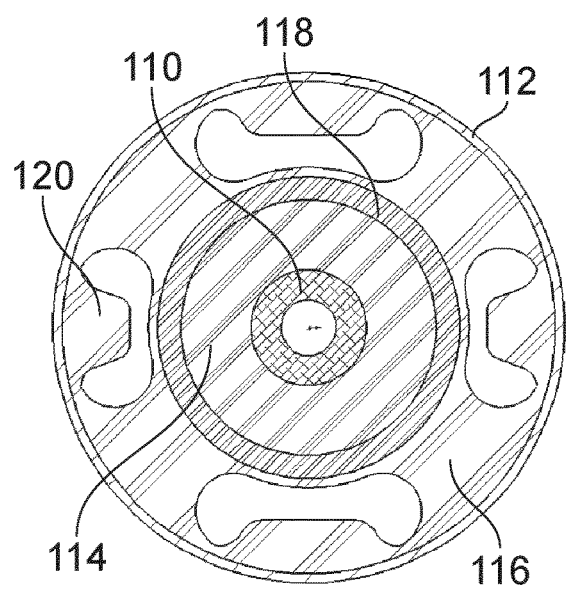
FIGS. 2A and 2B show cross-sectional views of the bush of FIG. 1.
Figure 2B:
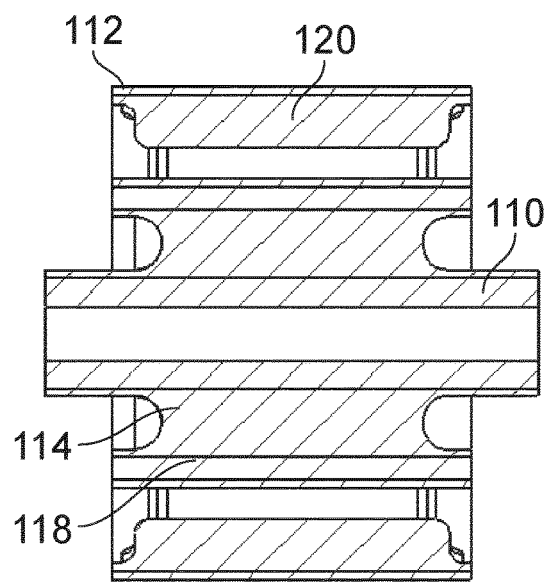

FIG. 1 is a perspective view of a bush 100 that is a first embodiment of the present invention. The bush 100 is a generally cylindrical structure that defines a longitudinal axis. FIG. 2A shows a cross-section of the bush 100 perpendicular to the longitudinal axis. FIG. 2B shows a cross-section of the bush 100 parallel to the longitudinal axis.

The bush 100 comprises a series of components arranged coaxially around the longitudinal axis. The components include a first anchor part 110 that is surrounded by and operably engaged with an inner resilient body 114. The inner resilient body 114 is surrounded by and operably engaged with an inertial mass element 118. The inertial mass element 118 is surrounded by and operably engaged with an outer resilient body 116, which in turn is surrounded by and operably engaged with a second anchor part 112. The function of each part will be described in more detail below. The bush 100 may have open end faces, as depicted in FIG. 1, or the end faces of the bush 100 may be partially or entirely covered. The bush may include fluid, e.g. hydraulic fluid, within voids defined in one or both of the resilient bodies.

The first anchor part 110 comprises a rigid rod, which may be a hollow tube, made from any suitable material, e.g. a metal such as steel. The first anchor part 110 is configured to be attached to a first component of vibrating machinery (not shown) in any conventional manner. In one example, the first anchor part 110 may have an inner diameter of 12 mm and an outer diameter of 25 mm, although the invention may be applicable to bushes having any dimensions.

The second anchor part 112 comprises a rigid sleeve, e.g. formed from metal or the like, disposed coaxially with the first anchor part 110 to define an annular space therebetween. The second anchor part 112 is configured to be attached to a second component of vibrating machinery (not shown). In one example, the second anchor part 112 may have an inner diameter of 105 mm and an outer diameter of 110 mm. The bush 100 may thereby be used as a mounting device between two components. For example, the first component may be an engine or motor and the second component may be the chassis of a vehicle. The bush 100 may be particularly suitable for use between the drive unit and chassis in an electric vehicle.

Concentric with the first anchor part 110 and the second anchor part 112 in the annular space therebetween, an inner resilient body 114 and an outer resilient body 116 are provided. The inner resilient body 114 and outer resilient body 116 may each be made of a resiliently deformable material such as rubber. The inner resilient body 114 and outer resilient body 116 may be formed from the same or different materials. In one example, the resilient material may be rubber having a hardness of between 45 and 50 as measured with a Shore A durometer.

The inner resilient body 114 and outer resilient body 116 are separated from each other by an inertial mass element 118, which in this example is a rigid annular element mounted between an outer surface of the inner resilient body 114 and an inner surface of the outer resilient body 116.

The inner resilient body 114, the inertial mass element 118, and the outer resilient body 116 may operate together to isolate vibrations between the first anchor part 110 and the second anchor part 112. In this way, the first component may be isolated from vibrations of the second component, and vice versa, by interconnecting the two components using the bush 100.

The inner resilient body 114 and the outer resilient body 116 may operate as independent springs on either side of the inertial mass element 118. The shape, material and configuration of the inner resilient body 114 may be selected so that the bush 100 exhibits a desirable dynamic stiffness characteristic, as discussed below. The outer resilient body 116 may be configured as a movement limiter to provide a level of control for significant relative movement events between the first and second anchor parts 110, 112, e.g. due to acceleration loads, pot hole events, cornering, crash, etc. In combination, the outer resilient body 116 combined with the snubbers 120 define a static stiffness curve which is tuned to give certain stiffness for a given force applied.

The inner resilient body 114 may comprise a solid (e.g. rubber) element filling the annular volume between the first anchor part 110 and the inertial mass element 118. The inner resilient body 114 may be directly moulded between these two components.

In some examples, the inner resilient body 114 may be bonded to one or both of the first anchor part 110 and the inertial mass element 118. For example, an inner bush formed by first anchor part 110 bonded to inner resilient body 114 may be push-fitted into inertial mass element 118 to increase durability. Similarly it could be desirable to push fit the first anchor part 110 into a bush sub-assembly formed by the inertial mass element 118 bonded to the outer resilient body 116 to increase durability. The increase in durability comes from pre-compressing the rubber to remove residual stresses caused by the rubber shrinking following moulding.

One or both of the inner resilient body 114 and outer resilient body 116 could either have voids/passageways or be solid rubber, as required by the desired stiffness characteristic.

The outer resilient body 116 may comprise a solid (e.g. rubber) element filling the annular volume between the second anchor part 112 and the inertial mass element 118. Alternatively, the outer resilient body 116 may have one or more axial passageways or voids extending therethrough. In other words it need not completely fill the annular volume between an outer surface of the inertial mass element 118 and an inner surface of the second anchor part 112. The passageways or voids in the outer resilient body 116 may operate as buffers or snubbers 120, 122 arranged to cushion large relative movements of the first component and/or the second component.

In this embodiment, the inertial mass element 118 is a rigid cylinder, e.g. made of a metal such as steel. The material and/or dimensions of the inertial mass element 118 may be selected in conjunction with the spring properties of the inner and outer resilient bodies 114, 116 so that the inertial mass exhibits a resonance condition at a vibration frequency outside (e.g. below) the intended usage range of the bush. Under normal use of the bush, the inertial mass element 118 thus occupies a non-resonant condition in which it isolates the dynamic stiffness increases associated with the eigenmodes of the inner and outer resilient bodies 114, 116. That is, each of the inner resilient body 114 and outer resilient body 116 have independent resonant frequencies, or eigenmodes, at which their dynamic stiffness increases. At vibration frequencies corresponding to these eigenmodes, the isolating effect provided by the inner resilient body 114 or the outer resilient body 166 is normal decreased. However, the presence of inertial mass element 118 acts to reduce or remove these stiffness increases from the overall dynamic stiffness characteristic of the bush 100 to provide a substantially flat dynamic stiffness characteristic for the bush as a whole. The inertial mass element 118 therefore ensures that the bush 100 effectively isolates vibrations of a first component of vibrating machinery from a second component of vibrating machinery across an operating frequency range of each component.

In one non-limiting example, the inertial mass element may have a mass of around 400 g. For example, the inner diameter of the inertial mass element 118 may be 55 mm and the outer diameter may be 65 mm.

Figure 3:
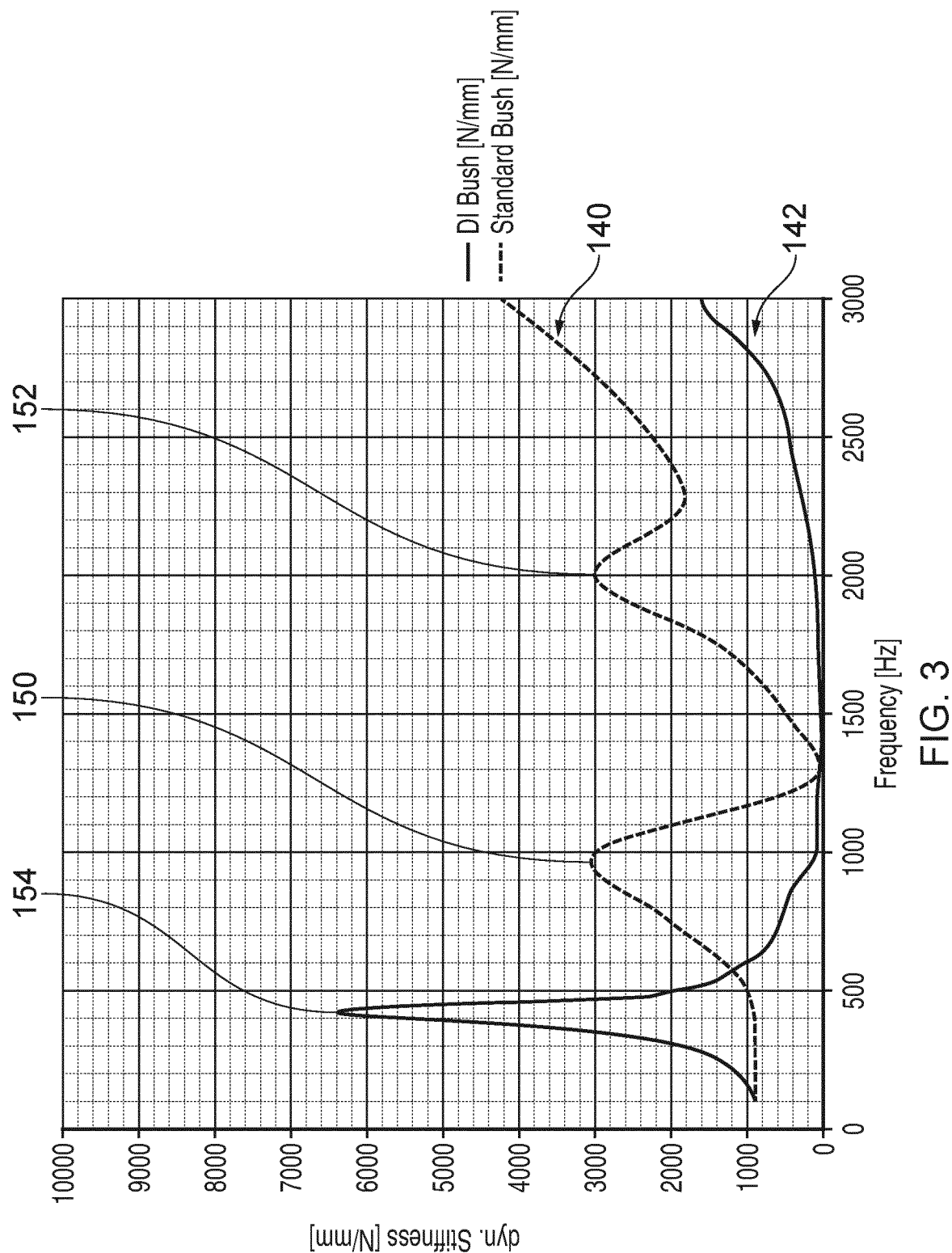
FIG. 3 is a graph showing dynamic stiffness against frequency for a known bush and a bush that is an embodiment of the present invention.

FIG. 3 shows a graph of dynamic stiffness against frequency for a known bush and a bush according to the present invention, such as bush 100 shown in FIGS. 1 and 2A-2B.

As can been seen in FIG. 3, a dynamic stiffness characteristic 140 for a known bush exhibit stiffness peaks 150, 152 corresponding to eigenmodes at approximately 1000 Hz and 2000 Hz. These peaks represent reduced vibrational isolation between two components interconnected by the bush. Where the bush is used to mount an engine or motor to the chassis of a vehicle, in one example, this may result in an uncomfortable ride for passengers. It is therefore desirable to reduce or eliminate the stiffness increases in the bush at these frequencies, and provide a bush having eigenmodes which lie outside a frequency range associated with normal operation of interconnected components.

A bush such as that shown in FIGS. 1 and 2A-2B, may have a dynamic stiffness characteristic 142 that exhibits a single peak 154 at a lower frequency, e.g. less than 500 Hz. Preferably this peak occurs at a frequency below 400 Hz. This peak is the eigenmode, or resonance peak, of the inertial mass between the inner resilient body and the outer resilient body. Preferably this eigenmode is at a frequency below the operating frequency range of the first component or the second component which are interconnected by the bush. The resonant frequency of the inertial mass element is dependent on the mass of that element, and also on the size or material of the inner resilient body and the outer resilient body. By adjusting these parameters, the eigenmode of the inertial mass element may be 'tuned' to a desired frequency.

The presence of the inertial mass element in the bush reduces or eliminates increases dynamic stiffness above the resonant frequency of the inertial mass element itself. That is, there are no peaks in dynamic stiffness of the bush due to either the inner resilient body or the outer resilient body. Vibrations are therefore effectively isolated by a bush according to the present invention across a broad range of vibration frequencies. Preferably this broad range covers the operating frequency range of a first component and a second component to be interconnected. For example, where a bush is used to interconnect an engine or motor and a chassis of a vehicle, use of a bush according to the present invention ensures passenger comfort.

Figure 4:
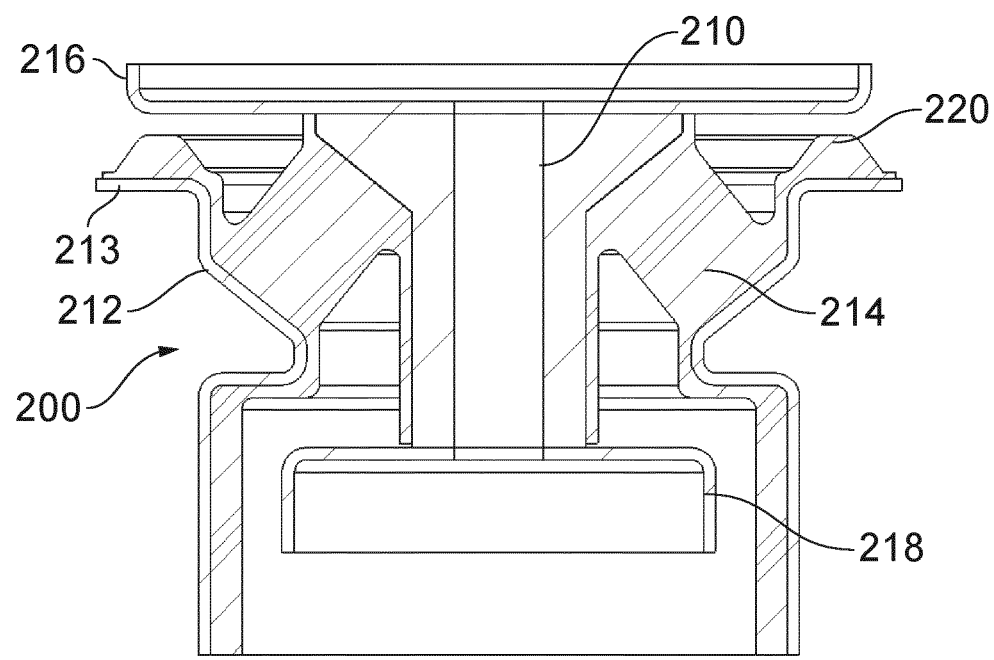
FIG. 4 is a cross-sectional view of a known vertically mounted bush.

FIG. 4 shows a cross-sectional view of a known vertically mounted bush 200. The bush 200 is generally cylindrical and comprises a first anchor part 210 and a second anchor part 212. The first anchor part 210 comprises a rigid boss element configured for attachment to a first component of vibrating machinery, and the second anchor part 212 comprises a cup element for receiving the boss element. The second anchor part 212 has an attachment region such as flange 213 configured for attachment to a second component of vibrating machinery. The second anchor part 212 is concentric with, and spaced apart from, the first anchor part 210 to define a generally annular region between the first anchor part 210 and the second anchor part 212. A ring of resiliently deformable material 214, such as rubber is disposed within this annular region to connect the first anchor part 210 and the second anchor part 212.

As the two components affixed to the bush 200 vibrate relative to each other, the ring of resilient material 214 deforms to isolate the vibration. However, the resilient material 214 has one or more eigenmodes at which the dynamic stiffness of the resilient material 214 increases, reducing vibrational isolation between the interconnected components.

Relative movement between two interconnected components is limited in the vertical (Z) direction, as viewed in FIG. 4, by an upper snubber plate 216 and a lower snubber plate 218.

The upper snubber plate 216 is connected to an upper end of the first anchor part 210, and limits the range of movement of the first anchor part 210 relative to the second anchor part 212 in a first direction (downwards as viewed in FIG. 4). The upper snubber plate 216 is sized to abut a snubbing surface 220 on the second anchor part 212 if relative movement in the first direction exceeds a threshold.

The lower snubber plate 218 is connected to a bottom end of the first anchor part 210, and limits the range of movement of the first anchor part 210 relative to the second anchor part 212 in a second direction that is opposite to the first direction (i.e. upwards as viewed in FIG. 4). The lower snubber plate 218 is sized to abut an interior wall of the second anchor part 212 if relative movement between the first anchor part 210 and second anchor part 212 in the second direction exceeds a threshold.

Figure 5:
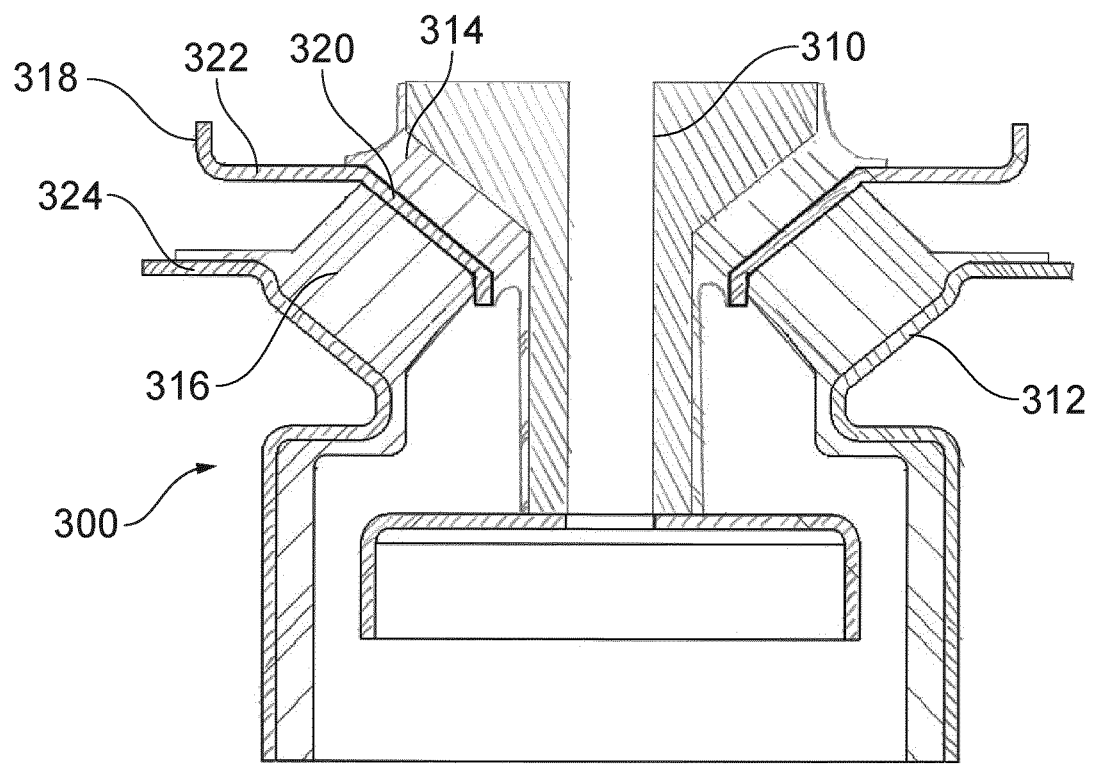
FIG. 5 is a cross-sectional view of a vertically mounted bush that is another embodiment of the present invention.

FIG. 5 shows a cross-sectional view of a vertically mounted bush 300 that is another embodiment of the present invention.

Similarly to the embodiment discussed above with reference to FIGS. 1 to 3, the anchor elements in bush 300 are connected to each other via a first resilient body 314 and second resilient body 316 with an inertial mass element 318 disposed between the first resilient body 314 and second resilient body 316. In this example, the first resilient body 314 is an annular element formed around, e.g. bonded to, a surface of the first anchor part 310. The first resilient body 314 may be bonded to an inclined surface of the first anchor part 310. The inclined surface may be in the form of a frustocone. The second resilient body 316 may be an annular element formed on, e.g. bonded to, a surface of the second anchor part 312. The second resilient body 316 may be bonded to an inclined surface of the second anchor part 312. The inclined surface may be angled in a similar manner to the frustoconical surface of the first anchor part 310, whereby the first resilient body 314 and second resilient body 316 cooperate to bridge a gap between the first anchor part 310 and second anchor part 312. The angled nature of the first and second resilient bodies may enable the bush to isolate vibrations having a radial and axial components.

The inertial mass element 318 in this example comprises a rigid annular plate portion 320 that separates the first resilient body 314 from the second resilient body 316. The rigid annular plate portion may by inclined such that a normal to its plane lies at an acute angle to an axis of the bush 300 and in line with a direction in which the first resilient body 314 and second resilient body 316 bridge a gap between the first anchor part 310 and second anchor part 312.

The inertial mass element 318 may also comprise a snubber portion 322 for restricting the extent of relative axial movement between the first anchor part 310 and second anchor part 312. In this example, the snubber portion is an annular flange that extends in a radial direction from an outer circumferential edge of the rigid annular plate portion away from the first and second resilient bodies. The second anchor part 312 may have a top flange 324 that extends in a radial direction. The annular flange may abut the top flange to restrict the distance by which the first anchor part 310 can move into the second anchor part 312.

In this example, the inertial mass element 318 may thus perform two functions. Firstly it can operate to reduce or remove dynamic stiffness increases in the bush 300 due to eigenmodes of the first resilient body 314 and second resilient body 316, in a similar manner as the inertial mass element 118 of bush 100 described above with respect to FIGS. 1 to 3. Secondly, it can operate to restrict relative axial movement between the first and second anchor parts 310, 312 in a similar manner to the upper snubber part 216 discussed above with reference to FIG. 4.

Figure 6:
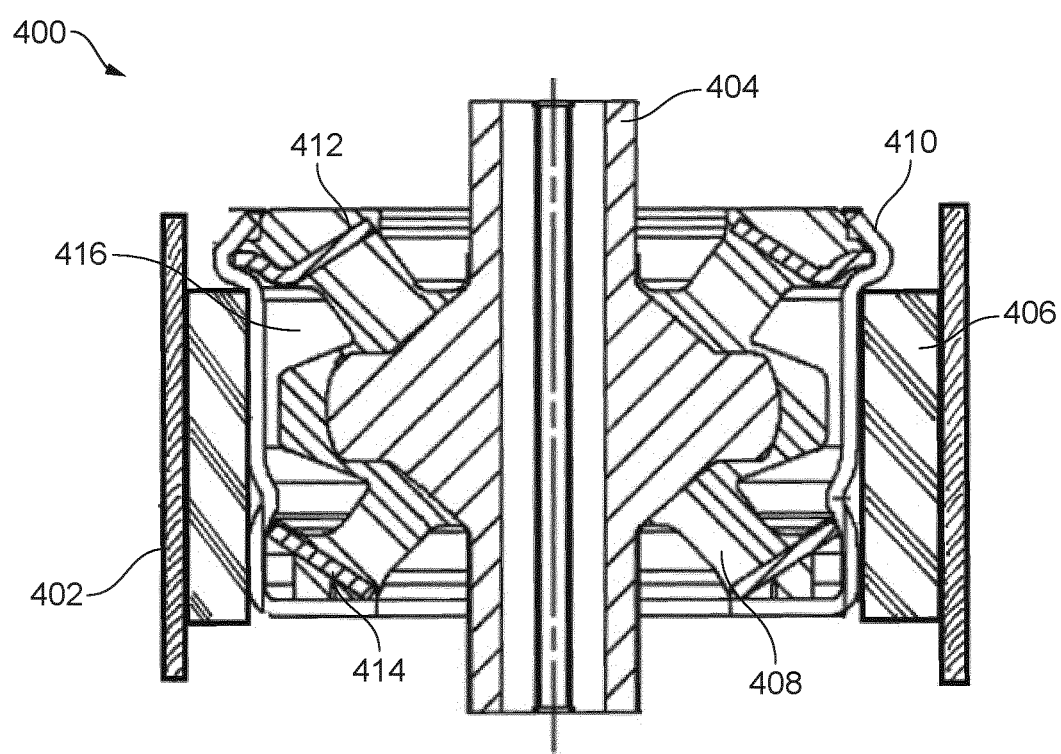
FIG. 6 is a cross-sectional view of a vertically mounted bush that is another embodiment of the present invention.

FIG. 6 shows a cross-sectional view of a vertically mounted bush 400 that is another embodiment of the present invention.

In this embodiment, a first anchor part 402 is connected to a vibrating element (e.g. motor) and a second anchor part 404 is connected to a chassis. The second anchor part 404 is a central rod member of a hydraulically damped vertical travel limiter. The second anchor part 404 is secured within a housing 410 by a first resilient body 408, which is disposed between the second anchor part 404 and rigid rings 412, 414 that are fixed within the housing 410.

The housing 410 is secured to the first anchor part 402 by a second resilient body 406, e.g. a rubber sleeve or the like.

The inertial mass element in this example comprises a combination of the components of the hydraulically damped vertical travel limiter disposed between the first resilient body 408 and the second resilient body 406, i.e. the housing 410, rigid rings 412, 414 and hydraulic fluid 416 within the housing 410. Thus, in additional to performing its normal function to limit vertical travel, the hydraulically damped device in FIG. 6 also provides an inertial mass to isolate the engine from the chassis FIG. 7 is a perspective view of a bush 500 that is a further embodiment of the present invention. The bush 500 is a generally cylindrical structure that defines a longitudinal axis. FIG. 8A shows a cross-section of the bush 500 perpendicular to the longitudinal axis. FIG. 8B shows a cross-section of the bush 500 parallel to the longitudinal axis.

The bush 500 is a modified version of the bush 100 shown in FIG. 1. Therefore, in the following, a description of the bush 500 is provided which focusses on the aspects of bush 500 which differ from the bush 100 of FIG. 1. Unless otherwise stated, it is to be understood that the structure and operation of the bush 500 is the same as the structure and operation of the bush 100 of FIG. 1.

The bush 500 has an inner resilient body 514 which includes one or more axial passageways or voids extending therethrough. In other words, the material of the inner resilient body 514 may not completely fill the annular volume between an inner surface of the inertial mass element 118 and an outer surface of the first anchor part 110. The portions of the inner resilient body 514 circumferentially in-between the passageways may be referred to as "legs". The passageways facilitate relative movement between the first and second anchor parts during loading.

The passageways in the inner resilient body 514 may include buffers or snubbers 520 to physically limit the extent of relative radial movement between the first and second anchor parts. Specifically, the snubbers 520 are arranged to restrict and cushion large relative movements (e.g. radial movements) of the first component (coupled to the first anchor 110) and/or the second component (coupled to the second anchor 112). For instance, the snubbers 520 restrict and cushion movements so as to protect the legs from becoming over-compressed and/or over-extended, which would otherwise reduce the lifespan of the bush 500. In the embodiment shown in FIG. 7, the snubbers 520 have a substantially "u" or "n" shaped cross section. Also, the passageways are substantially "u" or "n" in cross-section. However, it is to be understood that in some other embodiments, the snubbers or passageways could have a different shaped cross-section.

In view of the above-described structure, the inner resilient body 514 may be configured as a movement limiter to provide a level of control for significant relative movement (e.g. radial movement) events between the first and second anchor parts 110, 112, e.g. due to acceleration loads, pot hole events, cornering, crash, etc. In combination, the inner resilient body 514 combined with the snubbers 520 define a static stiffness curve which is tuned to give certain stiffness for a given force applied.

The inner resilient body 514 and the outer resilient body 116 may operate as independent springs. Since the inner and outer resilient bodies have corresponding structures, e.g. they both include passageways with snubber portions, the bush 500 is balanced and provides balanced vibration isolation because the inner and outer resilient bodies have substantially the same spring characteristics. For example, the passageways with snubber portions mean that both the inner and outer resilient bodies (514, 116) have a relatively soft spring characteristic, compared to a version of the embodiment of FIG. 1 in which the outer resilient body 116 has passages and so is relatively soft, but the inner resilient body 114 has no passages and so is relatively hard.

It is to be understood that the spring characteristics of a resilient body will depend on the number of passages and the number of snubber portions that the resilient body has. Therefore, in order that the bush 500 remains balanced, the inner and outer resilient bodies may have the same number of passageways and snubber portions. Also, the general shape of the passages and snubber portions may be same in the inner resilient body 514 and the outer resilient body 116, although the dimensions of the inner resilient body 514 will be less than those of the outer resilient body 116.

For example, under normal operating conditions, loading on the bush 500 at the first and second anchor parts causes the passageways to distort to permit relative radial movement between the first and second anchor parts so as to isolate vibrations. Under these normal conditions, the distortion of the passageways may be insufficient to cause the snubbers 520 to physically limit the extent of relative radial movement between the first and second anchors. For instance, the number of passageways and/or snubbers, and/or the dimensions/shape of the passageways and/or snubbers may be chosen so that, under normal operating conditions, the passageways distort without using the snubbers 520. However, under abnormal operating conditions, loading on the bush 500 at the first and second anchor parts causes the passageways to distort to such an extent that the snubbers 520 physically limit the extent of relative radial movement between the first and second anchor parts. Under these abnormal conditions, the snubbers 520 protect the resilient bodies from over-compression and over-extension to prolong the operational life of the bush 500. Also, the snubbers 520 control a maximum displacement of the first and second anchor parts to reduce the chance that they (and the components to which they are fixed) will hit neighbouring components and cause damage. For instance, the number of passageways and/or snubbers, and/or the dimensions/shape of the passageways and/or snubbers may be chosen so that, under abnormal operating conditions, the passageways distort to such an extent that the snubbers 520 are used. In an example, the bush 500 may be used in an electric vehicle (e.g. car), and the normal operating conditions may include maintaining a cruising speed (e.g. 50 km/h to 100 km/h) on a motorway. On the other hand, the abnormal operating conditions may include: accelerating the car from a stationary start with maximum acceleration, performing an emergency stop, or driving over rough surfaces (e.g. pot holes, cobble stones).

Figure 9:
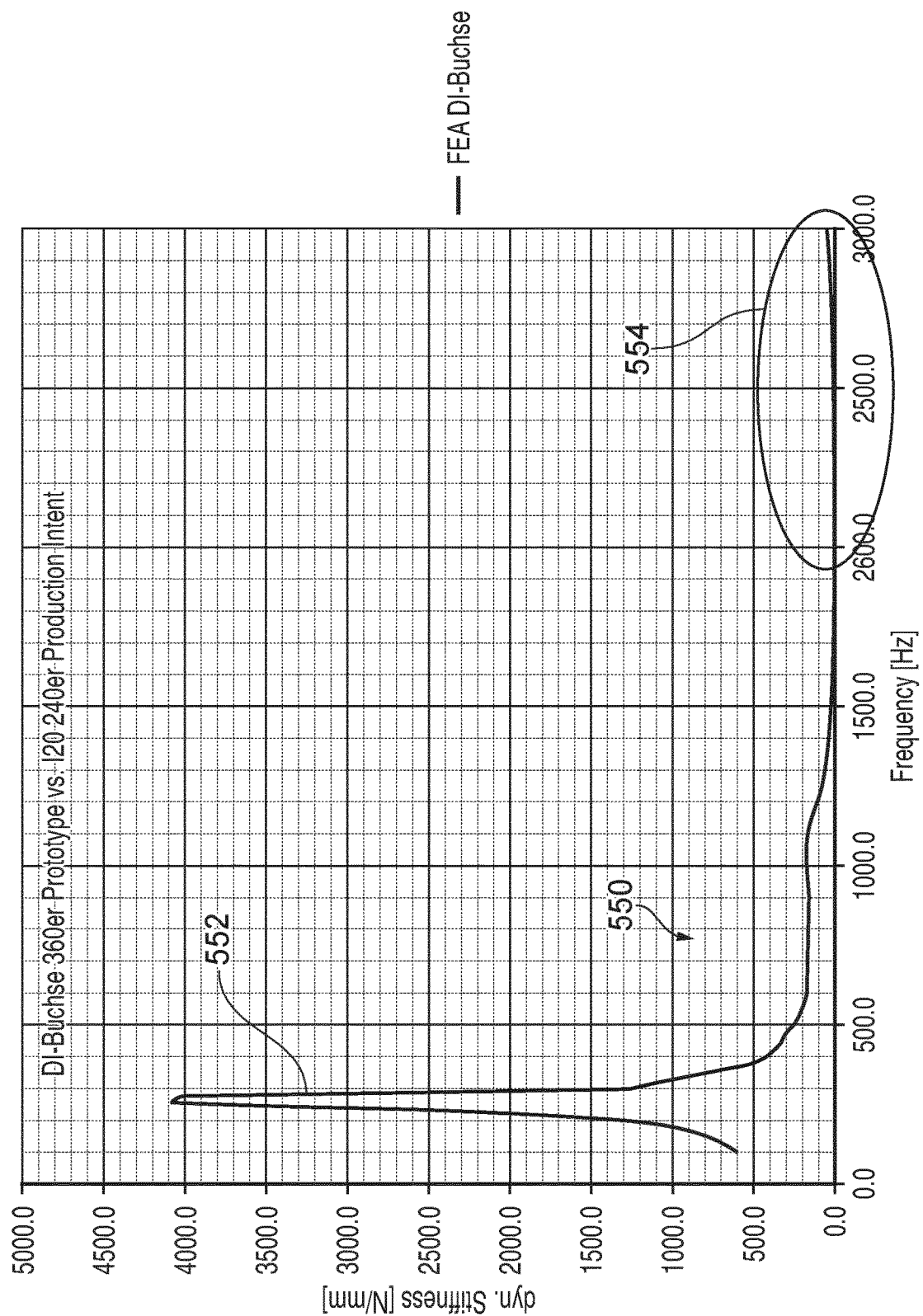
FIG. 9 is a graph showing dynamic stiffness against frequency for the bush of FIG. 7.

FIG. 9 shows a graph of dynamic stiffness against frequency for the bush 500 shown in FIGS. 7 and 8A-8B. The graph of FIG. 9 corresponds with that of FIG. 3.

As seen on FIG. 9, the bush 500 may have a dynamic stiffness characteristic 550 that exhibits a single peak 552 at a lower frequency, e.g. less than 500 Hz. Preferably this peak occurs at a frequency below 400 Hz. This peak is the eigenmode, or resonance peak, of the inertial mass between the inner resilient body and the outer resilient body. Preferably this eigenmode is at a frequency below the operating frequency range of the first component or the second component which are interconnected by the bush. The resonant frequency of the inertial mass element is dependent on the mass of that element, and also on the size, shape or material of the inner resilient body and the outer resilient body. By adjusting these parameters, the eigenmode of the inertial mass element may be 'tuned' to a desired frequency.

The presence of the inertial mass element in the bush reduces or eliminates increases in dynamic stiffness above the resonant frequency of the inertial mass element itself. That is, there are no peaks in dynamic stiffness of the bush due to either the inner resilient body or the outer resilient body. More specifically, the modifications to bush 500, i.e. the introduction of passages with snubber portions 520 into the inner resilient body 514 has improved the vibration isolation performance, as can be seen by comparing the higher frequency portion of dynamic stiffness characteristic 550 of FIG. 9 with the higher frequency portion of dynamic stiffness characteristic 142 of FIG. 3. It is clearly visible that the characteristic 550 maintains a more consistent and reduced dynamic stiffness over higher frequencies compared to the characteristic 142. For example, see the region of characteristic 550 highlighted by the reference sign 554.

In view of the above, vibrations are therefore effectively isolated by the bush 500 across a broad range of vibration frequencies. Preferably this broad range covers the operating frequency range of a first component and a second component to be interconnected. For example, where the bush 500 is used to interconnect an engine or motor and a chassis of a vehicle, use of the bush 500 ensures passenger comfort.

FIG. 10A is a perspective view of a bush 600 that is a further embodiment of the present invention. The bush 600 is a generally cylindrical structure that defines a longitudinal axis. FIG. 10A shows a first end of the bush 600, whereas FIG. 10B shows a second, opposite end of the bush 600. FIG. 10C shows a cross-section of the bush 600 perpendicular to the longitudinal axis. FIG. 10D shows a cross-section of the bush 600 parallel to the longitudinal axis.

The bush 600 is a modified version of the bush 100 shown in FIG. 1. Therefore, in the following, a description of the bush 600 is provided which focusses on the aspects of bush 600 which differ from the bush 100 of FIG. 1. Unless otherwise stated, it is to be understood that the structure and operation of the bush 600 is the same as the structure and operation of the bush 100 of FIG. 1.

The bush 600 has an inner resilient body 614 which includes one or more axial passageways or voids extending therethrough. In other words, the material of the inner resilient body 614 may not completely fill the annular volume between an inner surface of the inertial mass element 118 and an outer surface of the first anchor part 110. The portions of the inner resilient body 614 circumferentially in-between the passageways may be referred to as "legs". The passageways facilitate relative movement between the first and second anchor parts during loading. In an embodiment, the inner resilient body 614 comprises a solid element (e.g. rubber) filling the annular volume between the first anchor part 110 and the inertial mass element 118. That is, the inner resilient body 614 may have no axial passages or voids extending therethrough.

The bush 600 has an outer resilient body 616 having a structure similar to that of the inner resilient body 614. That is, the outer resilient body 616 may have one or more axial passageways or voids extending therethrough. Alternatively, the outer resilient body 616 may be solid, i.e. without axial passageways or voids.

In contrast to the bush 500, if present, the passageways or voids of the bush 600 may not include any buffers or snubbers. Instead, as seen more particularly on FIGS. 10A and 10D, the second anchor part 112 includes a snubber portion 620 which is arranged to physically limit an extent of relative radial movement between the first anchor part 110 and the second anchor part 112. Specifically, the snubber portion 620 may be formed from a protrusion which extends radially towards the first anchor part 110. The snubber portion 620 may have a substantially annular or ring-shaped form, as seen most clearly on FIG. 10A. The protrusion extends only part way towards the first anchor part 110 so as to permit some radial movement between the first and second anchor parts. That is, a radial length of the snubber 620 may be selected so as to permit radial movement up to a predetermined amount. As seen on FIG. 10D, a tip portion of the protrusion may be constructed from a different material than the rest of the snubber 620. For example, the tip portion may be made from a resilient material (e.g. rubber) whereas the rest of the snubber 620 may be made from a rigid material (e.g. metal). Alternatively, the whole snubber 620 may be made from a single material, such as a resilient material, like rubber.

In use, the snubber 620 is arranged to restrict and cushion large relative movements (e.g. radial movements) of the first component (coupled to the first anchor 110) and/or the second component (coupled to the second anchor 112). For instance, the snubber 620 restricts and cushions movements so as to protect the first and second resilient bodies from becoming over-compressed and/or over-extended, which would otherwise reduce the lifespan of the bush 600.

In view of the above-described structure, the snubber 620 is configured as a movement limiter to provide a level of control for significant relative movement (e.g. radial movement) events between the first and second anchor parts 110, 112, e.g. due to acceleration loads, pot hole events, cornering, crash, etc. In combination, the snubber 620, the inner resilient body 614, and the outer resilient body 616 define a static stiffness curve which is tuned to give certain stiffness for a given force applied.

The inner resilient body 614 and the outer resilient body 616 may operate as independent springs. Since the inner and outer resilient bodies may have corresponding structures, e.g. they may either both include passageways without snubber portions or both be solid, the bush 600 can be balanced and provides balanced vibration isolation because the inner and outer resilient bodies can have substantially the same spring characteristics.

Where passageways without snubber portions are present, it is to be understood that the spring characteristics of a resilient body will depend on the number of passages that the resilient body has. Therefore, in order that the bush 600 remains balanced, the inner and outer resilient bodies may have the same number of passageways. Also, the general shape of the passages may be same in the inner resilient body 614 and the outer resilient body 616, although the dimensions of the inner resilient body 614 will be less than those of the outer resilient body 616.

For example, where passageways without snubber portions are present, under normal operating conditions, loading on the bush 600 at the first and second anchor parts causes the passageways to distort to permit relative radial movement between the first and second anchor parts so as to isolate vibrations. Under these normal conditions, the distortion of the passageways may be insufficient to cause the snubber 620 to impact the first anchor part 110. As such, the snubber 620 does not physically limit the extent of relative radial movement between the first and second anchors. For instance, the number of passageways, and/or the dimensions/shape of the passageways and snubber 620 may be chosen so that, under normal operating conditions, the passageways distort without using the snubber 620. However, under abnormal operating conditions, loading on the bush 600 at the first and second anchor parts causes the passageways to distort to such an extent that the snubber 620 physically limits the extent of relative radial movement between the first and second anchor parts (i.e. the snubber 620 hits the first anchor 110). Under these abnormal conditions, the snubber 620 protects the resilient bodies from over-compression and over-extension to prolong the operational life of the bush 600. Also, the snubber 620 controls a maximum displacement of the first and second anchor parts to reduce the chance that they (and the components to which they are fixed) will hit neighbouring components and cause damage. For instance, the number of passageways, and/or the dimensions/shape of the passageways and snubber 620 may be chosen so that, under abnormal operating conditions, the passageways distort to such an extent that the snubber 620 is used. In an example, the bush 600 may be used in an electric vehicle (e.g. car), and the normal operating conditions may include maintaining a cruising speed (e.g. 50 km/h to 100 km/h) on a motorway. On the other hand, the abnormal operating conditions may include: accelerating the car from a stationary start with maximum acceleration, performing an emergency stop, or driving over rough surfaces (e.g. pot holes, cobble stones). It is to be understood that where the first and second resilient bodies are solid (i.e. without passageways), it is the material of the resilient bodies that distorts rather than the passageways.

An advantage of the snubber 620 compared to the snubbers 120 and 520, is that the snubber 620 directly acts on the anchor parts because the snubber 620 is directly attached to the second anchor part 112 and directly impacts the first anchor part 110. On the other hand, the snubbers 120 and 520 are located in passages of the resilient bodies and so their snubbing effect is indirect because these snubbers do not attach to or impact the anchor parts directly. Also, the snubbers 120 and 520 perform their snubbing effect through the inertial mass element 118. Conversely, the snubbing effect of the snubber 620 is independent of the inertial mass element 118. Accordingly, when using the snubber 620, the inertial mass element 118 has minimal or no major stiffness rise (as in the embodiment of FIGS. 1, 2A and 2B) allowing the frequency peak to remain stable under normal as well as abnormal operating conditions. Also, when using the snubber 620, it is not necessary to have passageways in the resilient bodies (i.e. the resilient bodies can be solid) and, therefore, manufacture of the resilient bodies is cheaper and simpler.

FIG. 11A is a perspective view of a bush 700 that is a further embodiment of the present invention. The bush 700 is a generally cylindrical structure that defines a longitudinal axis. FIG. 11A shows a first end of the bush 700, whereas FIG. 11B shows a second, opposite end of the bush 700. FIG. 11C shows a cross-section of the bush 700 perpendicular to the longitudinal axis. FIG. 11D shows a cross-section of the bush 700 parallel to the longitudinal axis.

The bush 700 is a modified version of the bush 600 shown in FIGS. 10A-D. Therefore, in the following, a description of the bush 700 is provided which focusses on the aspects of bush 700 which differ from the bush 600 of FIGS. 10A-D. Unless otherwise stated, it is to be understood that the structure and operation of the bush 700 is the same as the structure and operation of the bush 600 of FIGS. 10A-D.

As seen on FIGS. 11A and 11D, the first anchor part 110 includes a snubber portion 720 which is arranged to physically limit an extent of relative radial movement between the first anchor part 110 and the second anchor part 112. Specifically, the snubber portion 720 may be formed from a protrusion which extends radially towards the second anchor part 112. The snubber portion 720 may have a substantially annular or ring-shaped form, as seen most clearly on FIG. 11A. The protrusion extends only part way towards the second anchor part 112 so as to permit some radial movement between the first and second anchor parts. That is, a radial length of the snubber 720 may be selected so as to permit radial movement up to a predetermined amount. As seen on FIG. 11D, a tip portion of the protrusion may be constructed from a different material that the rest of the snubber 720. For example, the tip portion may be made from a resilient material (e.g. rubber) whereas the rest of the snubber 720 may be made from a rigid material (e.g. metal). Alternatively, the whole snubber 720 may be made from a single material, such as a resilient material, like rubber.

In use, the snubber 720 is arranged to restrict and cushion large relative movements (e.g. radial movements) of the first component (coupled to the first anchor 110) and/or the second component (coupled to the second anchor 112). For instance, the snubber 720 restricts and cushions movements so as to protect the first and second resilient bodies from becoming over-compressed and/or over-extended, which would otherwise reduce the lifespan of the bush 700.

It is to be understood that in some other embodiments, the bush may include both snubbers within passageways, as per FIG. 2A or 8A, and snubbers outside of passageways, as per FIG. 10D or 11D. Also, the resilient bodies of FIGS. 10A-10D and 11A-11D may be solid, i.e. without passageways.

Additionally, in some other embodiments, the bush may include both the snubber 620 of FIG. 10D and the snubber 720 of FIG. 11D. Specifically, each snubber 620, 720 may extend towards each other but be dimensioned such that, under normal operating conditions, a gap or space is maintained between the snubbers 620, 720. Then, under abnormal operating conditions, the snubber 620 may impact the snubber 720 so as to physically limit an extent of relative radial movement between the first and second anchor parts. Of course, the snubbers 620, 720 may have the same or different radial lengths.

Also, in some other embodiments, snubber portions (e.g. 620 and/or 720) may be positioned on both ends of the bush, rather than only on one end as shown in FIGS. 10A-10D and 11A-11D.

Further, in some other embodiments, the snubber 620 or 720 may be positioned at or near a middle of the bush. For instance, taking the example of FIG. 11D, the snubber 620 may be attached to the first anchor 110 half way along its length. Also, the inner resilient body 614, the inertial mass element 118, and the outer resilient body 616 may be split into two halves (e.g. via a cut perpendicular to a longitudinal axis of the first anchor 110) with the first half being positioned on the left side of the snubber 620, and the second half being positioned on the right side of the snubber 620. A similar modification could be made to the example of FIG. 10D. This type of embodiment is illustrated by the embodiment of FIGS. 12A to 12D, which will be described next.

Figure 12A:
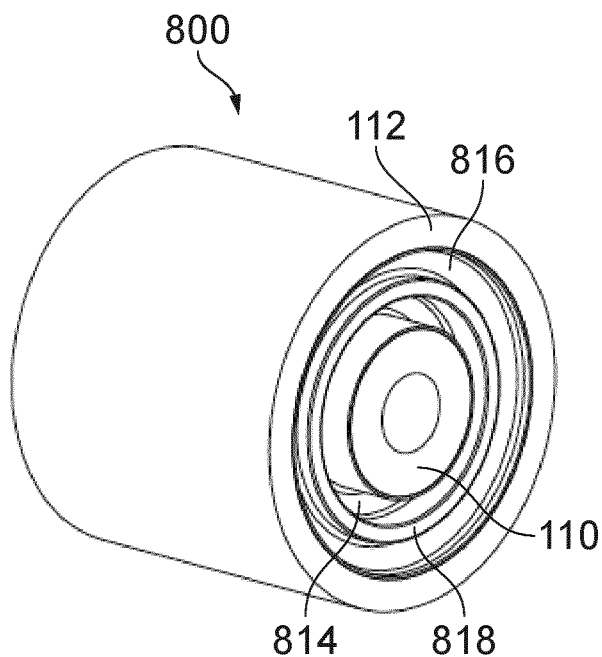
FIG. 12A is a perspective view of a first end of a bush that is yet another further embodiment of the present invention.
Figure 12B:
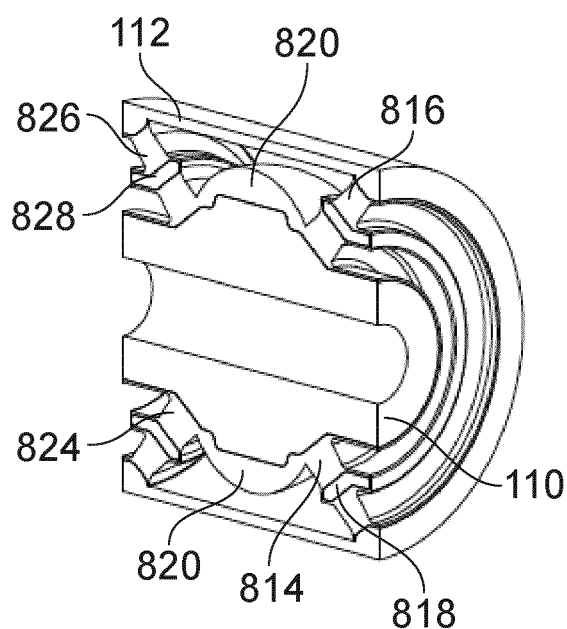
FIG. 12B is a perspective cross-sectional view of FIG. 12A along a longitudinal axis thereof.
Figure 12C:
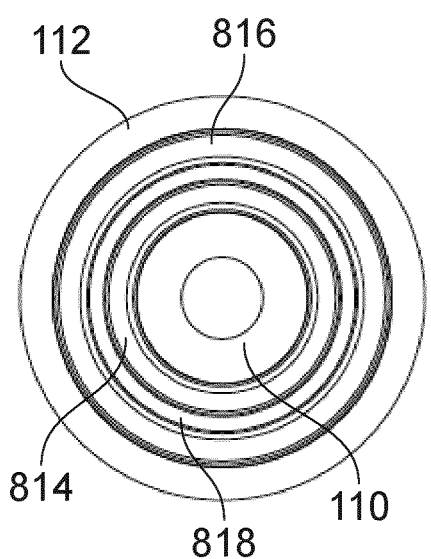
FIG. 12C is an end-on view of the first end of the bush of FIG. 12A.
Figure 12D:
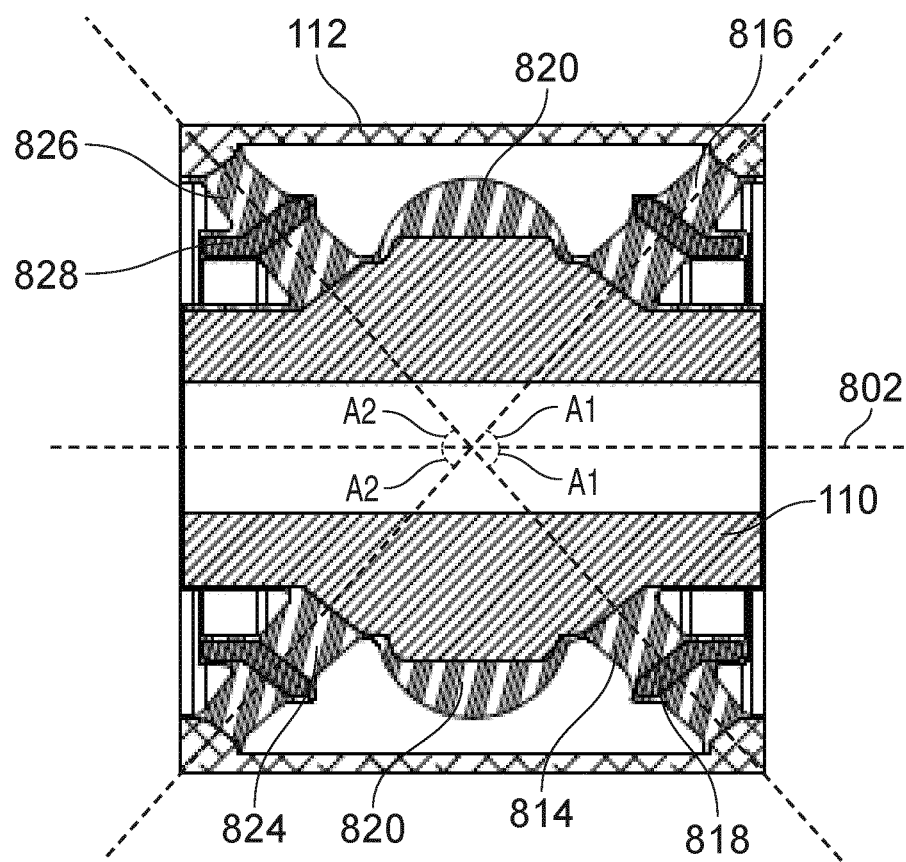
FIG. 12D is a side cross-sectional view of the bush of FIG. 12A along a longitudinal axis thereof.

FIG. 12A is a perspective view of a bush 800 that is a further embodiment of the present invention. The bush 800 is a generally cylindrical structure that defines a longitudinal axis 802 (see FIG. 12D). FIG. 12A shows a perspective view of a first end of the bush 800, whereas FIG. 12B shows a corresponding cross-sectional view. FIG. 12C shows an end-on view of the first end. FIG. 12D shows a side-on cross-section of the bush 800 which is similar to the view of FIG. 12B.

The bush 800 is a modified version of the bush 700 shown in FIGS. 11A-D. Therefore, in the following, a description of the bush 800 is provided which focusses on the aspects of bush 800 which differ from the bush 700 of FIGS. 11A-D. Unless otherwise stated, it is to be understood that the structure and operation of the bush 800 is the same as the structure and operation of the bush 700 of FIGS. 11A-D.

As seen on FIGS. 12B and 12D, the first anchor part 110 includes a snubber portion 820 which is arranged to physically limit an extent of relative radial movement between the first anchor part 110 and the second anchor part 112. Specifically, the snubber portion 820 may be formed from a protrusion which extends radially towards the second anchor part 112. The snubber portion 820 may have a substantially annular or ring-shaped form. The protrusion extends only part way towards the second anchor part 112 so as to permit some radial movement between the first and second anchor parts. That is, a radial length of the snubber 820 may be selected so as to permit radial movement up to a predetermined amount. As seen on FIGS. 12B and 12D, a tip portion of the protrusion may be constructed from a different material than a base of the snubber 820. For example, the tip portion may be made from a resilient material (e.g. rubber) whereas the base of the snubber 820 may be made from a rigid material (e.g. metal). Alternatively, the whole snubber 820 may be made from a single material, such as a resilient material, like rubber.

In use, the snubber 820 is arranged to restrict and cushion large relative movements (e.g. radial movements) of the first component (coupled to the first anchor 110) and/or the second component (coupled to the second anchor 112). For instance, the snubber 820 restricts and cushions movements so as to protect the resilient bodies from becoming over-compressed and/or over-extended, which would otherwise reduce the lifespan of the bush 800. The snubber 820 operates in an analogous manner to the snubber 720 of FIGS. 11A to 11D.

As seen on FIGS. 12B and 12D, the bush 800 has a first (e.g. first inner) resilient body 814 which comprises a solid element (e.g. rubber) filling the annular volume between the first anchor part 110 and an inertial mass element 818. That is, the first resilient body 814 may have no axial passages or voids extending therethrough. However, in some other embodiments, the first resilient body 814 may not completely fill the annular volume between an inner surface of the inertial mass element 818 and an outer surface of the first anchor part 110. That is, the first resilient body 814 may have one or more axial passageways or voids extending therethrough, in a similar manner to the inner resilient body 614 of FIGS. 10A-D and 11A-D. These passageways may further facilitate relative movement between the first and second anchor parts during loading. These passageways may be aligned with the longitudinal axis 802, however, since the resilient bodies are inclined to the longitudinal axis 802 (as described below), the passageways, if present, may instead be inclined with the resilient bodies.

The bush 800 has a second (e.g. first outer) resilient body 816 having a structure similar to that of the first resilient body 814. That is, the second resilient body 816 may have one or more axial passageways or voids extending therethrough. Alternatively, the second resilient body 816 may be solid, i.e. without axial passageways or voids.

The first resilient body 814, the second resilient body 816 and inertial mass element 818 together form a first frustoconical interconnection between the first anchor part 110 and the second anchor part 112. As such, the first resilient body 814, the inertial mass element 818 and the second resilient body 816 cooperate to bridge a gap between the first anchor part 110 and second anchor part 112. Specifically, the first resilient body 814, the inertial mass element 818, and the second resilient body 816 combine to form a substantially frustroconically-shaped structure which is coaxial with the longitudinal axis 802. Further, the frustroconical shape (i.e. the conical surface) extends away from the first anchor part 110, and towards the second anchor part 112, at the same non-normal angle with respect to the longitudinal axis 802. This non-normal angle is shown in FIG. 12D as angle A1. The non-normal angle A1 may be an acute angle, such as, between 15 degrees and 65 degrees, for example, about 40 degrees.

More specifically, the first resilient body 814 extends away from the first anchor part 110 at a first non-normal angle A1 (e.g. acute) with respect to the longitudinal axis 802. To facilitate this, a portion of the first anchor part 110 that is operatively engaged with the first resilient body 814 includes an angled platform or surface, and a normal of a plane of the platform or surface is angled at the first non-normal angle A1. The first resilient body 814 may be bonded to this platform. Also, the second resilient body 816 extends away from the second anchor part 112 at a second non-normal angle A1 (e.g. acute) with respect to the longitudinal axis 802. To facilitate this, a portion of the second anchor part 112 that is operatively engaged with the second resilient body 816 includes an angled platform or surface, and a normal of a plane of the platform or surface is angled at the second non-normal angle A1. The second resilient body 816 may be bonded to this platform. The first and second non-normal angles are shown in FIG. 12D as being the same angle A1; however, in some embodiments they could be different angles, for example, different acute angles. Further, the inertial mass element 818 includes a substantially frustroconically-shaped portion. That is, the inertial mass element 818 comprises a rigid separating portion, e.g. in the form or a plate or the like, which physically separates the first resilient body 814 from the second resilient body 816. The rigid separating portion is an annular planar element extending circumferentially around the bush. A normal of the plane of the planar element is inclined to the longitudinal axis 802 by, for example, an acute angle, such as 15-65 degrees, e.g. 40 degrees. It is possible that this angle is the same as angle A1. Additionally, the inertial mass element 818 includes a substantially cylindrically-shaped portion extending from, and axially aligned with, the substantially frustroconically-shaped portion. The substantially cylindrically-shaped portion may be used to engage with a tool during installation or maintenance of the bush 800.

Additionally, the bush 800 may optionally include: a third (e.g. second inner) resilient body 824 operably engaged with the first anchor part 110; a fourth (e.g. second outer) resilient body 826 operably engaged with the second anchor part 112; and a second inertial mass element 828 disposed between the first anchor part 110 and the second anchor part 112. As can be seen clearly on FIG. 12D, the third resilient body 824, the second inertial mass element 828 and the fourth resilient body 826 are structurally and functionally analogous to the first resilient body 814, the inertial mass element 818 and the second resilient body 816, and so it is to be understood that elements 824, 828 and 826 are the same as elements 814, 818 and 816 unless otherwise stated. That is, the second inertial mass element 828 is independently connected to the third resilient body 824 and the fourth resilient body 826. Also, the third resilient body 824, fourth resilient body 826 and second inertial mass element 828 are arranged to isolate vibrations between the first anchor part 110 and the second anchor part 112 within a predetermined operational frequency range. Further, the second inertial mass element 828 is arranged to isolate the first anchor part 110 and second anchor part 112 from dynamic stiffness increases associated with eigenmodes of the third resilient body 824 and the fourth resilient body 826 in the predetermined operational frequency range.

Further, the third resilient body 824, fourth resilient body 826 and second inertial mass element 818 together form a second frustoconical interconnection between the first anchor part 110 and the second anchor part 112. However, as seen clearly on FIG. 12D, the frustroconical shape of the second frustroconical interconnection is a mirror of the frustroconical shape of the first frustroconical interconnection made up from the first resilient body 814, the inertial mass element 818 and the second resilient body 816. Stated differently, whilst the first and second frustroconical interconnections extend away from the first anchor part at substantially the same angle to the longitudinal axis 802, the first frustroconical interconnection extends in an opposite direction along the longitudinal axis compared to the second frustroconical interconnection. Looking at FIG. 12D, the first frustroconical interconnection extends right from the first anchor part, whereas the second frustroconical interconnection extends left from the first anchor part. Stated differently, if the first frustroconical interconnection is positioned side-by-side with the second frustroconical interconnection, then their resultant cross-sections would form a ">
<" type shape. Thus, where the first and second resilient bodies extend at an angle A1 with respect to the longitudinal axis 802, the third and fourth resilient bodies extend at an angle A2 with respect to the longitudinal axis 802. Also, where a normal of the plane of the inertial mass element 818 may be the same as angle A1, a normal of the plane of the second inertial mass element 828 may be the same as angle A2. Further, the angles A1 and A2 are the same in the embodiment of FIG. 12A-D.

It is to be understood that in FIG. 12D the angle A1 is shown as being the exact mirror of the angle A2, for example, A1 and A2 may be the same angle, such as the same acute angle, such as an angle between 15 degrees and 65 degrees, e.g. 40 degrees. However, it is to be understood that in some other embodiments, A1 and A2 may be different angles, such as different acute angles.

In use, the operation of the bush 800 is similar to the operation of the bush 700. That is, the snubber 820 is arranged to restrict and cushion large relative movements (e.g. radial movements) of the first component (coupled to the first anchor 110) and/or the second component (coupled to the second anchor 112). For instance, the snubber 820 restricts and cushions movements so as to protect the first and second resilient bodies (and, if present, the third and fourth resilient bodies) from becoming over-compressed and/or over-extended, which would otherwise reduce the lifespan of the bush 800. A difference between the operation of the bush 700 and the bush 800 is that axial stiffness is increased in the bush 800 due to the resilient bodies of the bush 800 being inclined with respect to the longitudinal axis. Specifically, resilient materials such as rubber tend to be relatively soft when loaded in shear but relatively stiff when loaded in compression. Considering the bush 700, axial loads tend to load the resilient bodies mostly in shear whereas, in the bush 800, axial loads tend to load the resilient bodies less in shear and more in compression compared to the bush 700. The exact proportion of shear loading vs. compression loading can be selected by choosing a particular angle of incline with respect to the longitudinal axis (e.g. by selecting particular values of A1 and A2). Accordingly, the bush 800 can provide increased axial stiffness compared to the bush 700.

As mentioned above, one or more of the resilient bodies may be solid or may include axially extending passageways or voids therethough. That is, in one embodiment, all resilient bodies may be solid and, in another embodiment, all resilient bodies may include passageways. Also, where passageways are present, one or more of such passageways may include snubber portions (e.g. like snubber portions 120 or 520 described above). Additionally, in further embodiments, only a subset of the resilient bodies may include passageways, and the remaining resilient bodies may be solid. In a first example, the first resilient body may include passageways (with or without snubbers), and the second resilient body may be solid, or visa versa. In a second example, the first and third resilient bodies may include passageways (with or without snubbers), and the second and fourth resilient bodies may be solid, or visa versa. It is to be understood that the axial passageways or voids maybe aligned with the longitudinal axis or be inclined with the resilient bodies.

As mentioned above, FIGS. 12A-D show that the first frustroconical interconnection (814, 818 and 816) extends away from the first anchor part 110 in an opposite direction along the longitudinal axis 802 compared to the second frustroconical interconnection (824, 828, 826). That is, the first frustroconical interconnection extends right from the first anchor part 110, and the second frustroconical interconnection extends left from the first anchor part 110. However, it is to be understood that in an alternative embodiment, the first frustroconical interconnection may extend left and the second frustroconical interconnection may extend right. As such, in this alternative embodiment, if the first and second frustroconical interconnections were to be positioned side-by-side, their resultant cross-sections would form a "< >" type shape. This alternative arrangement can also be seen by looking at the embodiment of FIG. 13B which is described below. Further, the first and second frustroconical interconnections may extend away from the first anchor part 110 along the longitudinal axis in the same direction, so as to form a ">>" type shape or "<<" type shape if placed side-by-side. Furthermore, as mentioned above, only the first frustroconical interconnection may be present, so as to form only a ">" type shape or only a "<" type shape. In this case, the first frustroconical interconnection may be positioned on either side of the snubber portion 820.

In the embodiment of FIGS. 12A-D, the dimensions (e.g. volume or cross-sectional area, height and/or width) of the first resilient body 814 are different from the dimensions of the second resilient body 816. For example, both the first and second resilient bodies taper width-wise in a direction away from the longitudinal axis 802 and, therefore, a cross-sectional area of the first resilient body is less than a cross-sectional area of the second resilient body. It is to be understood, that in some other embodiments, the cross-sectional dimensions of the first resilient body 814 may be the same or smaller than the cross-sectional dimensions of the second resilient body 816. The exact dimensions and the relative sizes of the first and second resilient bodies may be selected depending on the precise spring characteristics required from the bush. For example, the first resilient body 814 may have the same width but a larger height compared to the second resilient body 816. The same applies to the dimensions (e.g. volume or cross-sectional area, height and/or width) of the third and fourth resilient bodies 824, 826. Additionally, the dimensions (e.g. volume or cross-sectional area, height and/or width) of the inertial mass element 818 may be the same or different (e.g. larger or smaller) compared to the second inertial mass element 828.

Figure 13A:
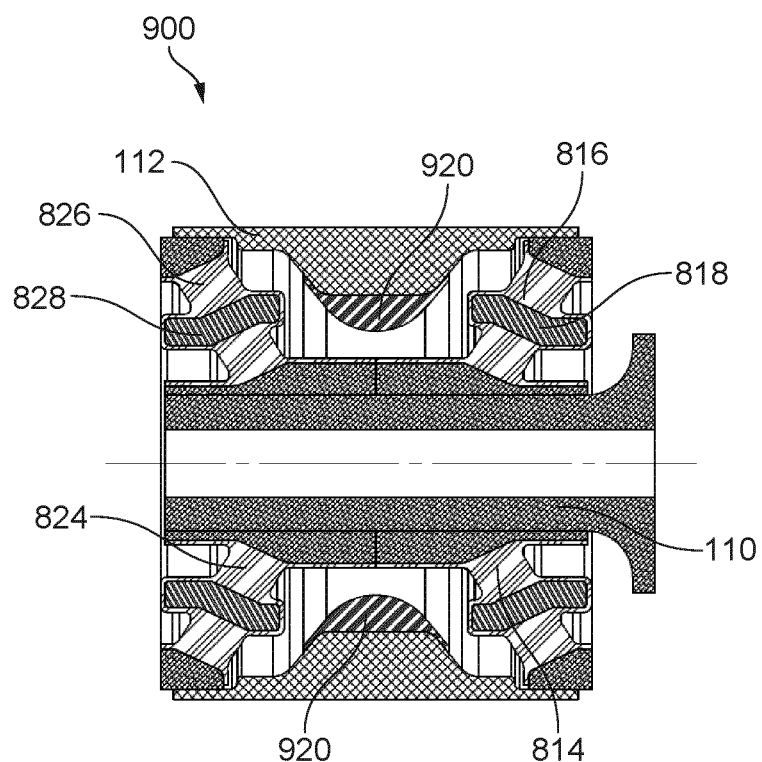
FIGS. 13A, 13B and 13C show cross-sectional views of three separate variants of the embodiment of FIGS. 12A-12D.
Figure 13B:
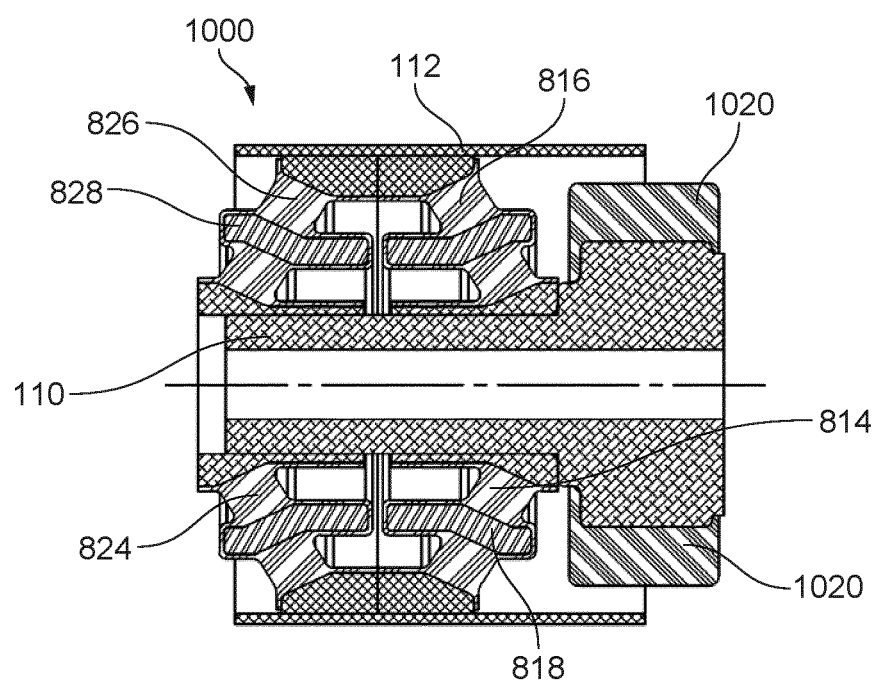
Figure 13C:
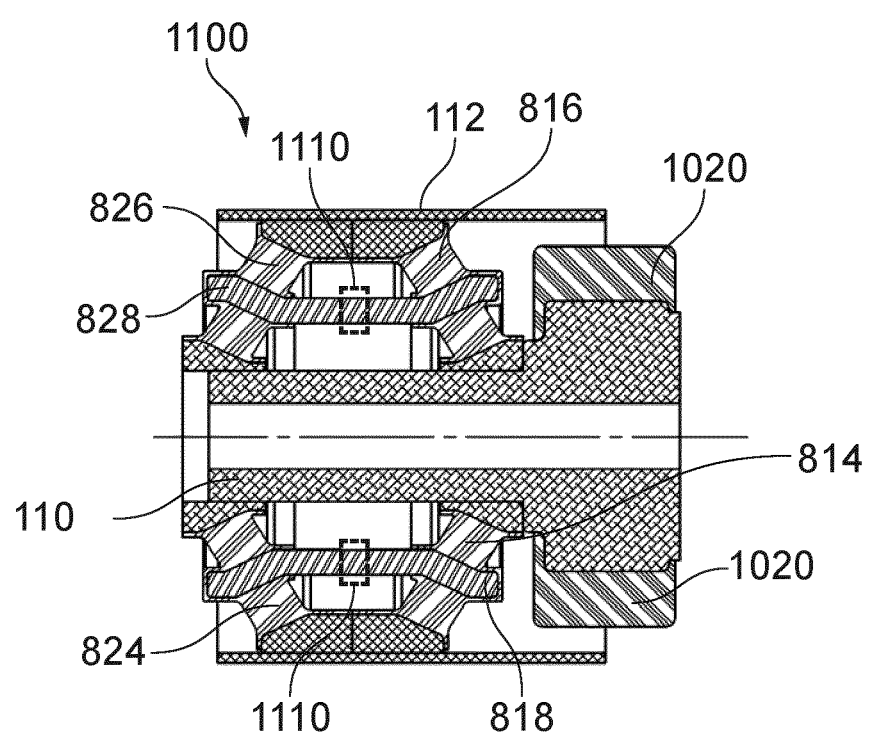

FIGS. 13A to 13C show four possible variants to the embodiment of FIGS. 12A-D, each of which will now be described in turn. Like reference signs refer to like components.

FIG. 13A shows a bush 900 which is a variant of the bush 800. In the following, a description of the bush 900 is provided which focusses on the aspects of bush 900 which differ from the bush 800. Unless otherwise stated, it is to be understood that the structure and operation of the bush 900 is the same as the structure and operation of the bush 800. As shown in FIG. 13A, the bush 900 includes a snubber portion 920 which is attached to the second anchor part 112. This is in contrast to snubber portion 820 of bush 800 which is instead attached to the first anchor part 110. This modification is analogous to the modification of the embodiment of FIGS. 10A-D to form the embodiment of FIG. 11A-D. Similarly, the bush 900 may include both the snubber portion 820 on the first anchor part 110 (as per FIG. 12D) and the snubber portion 920 on the second anchor part 112 (as per FIG. 13A). Specifically, each snubber 820, 920 may extend towards each other but be dimensioned such that, under normal operating conditions, a gap or space is maintained between them. Then, under abnormal operating conditions, the snubbers 820, 920 may impact each other so as to physically limit an extent of relative radial movement between the first and second anchor parts. Of course, the two snubbers 820, 920 may have the same or different radial lengths.

FIG. 13B shows a bush 1000 which is a variant of the bush 800. In the following, a description of the bush 1000 is provided which focusses on the aspects of bush 1000 which differ from the bush 800. Unless otherwise stated, it is to be understood that the structure and operation of the bush 1000 is the same as the structure and operation of the bush 800. As shown in FIG. 13B, the bush 1000 includes a snubber portion 1020 which is attached to the first anchor part 110. Additionally, the first frustroconical interconnection (814, 818 and 816) and the second frustroconical interconnection (824, 828 and 826) are positioned on the same side of the snubber portion 1020 (e.g. the left side). This is in contrast to the embodiment of FIG. 12D where the first and second frustroconical interconnections are positioned on opposite sides of the snubber portion 820. As with the embodiment of FIG. 12D, the first and second frustroconical interconnections can extend at the same or different angles with respect to the longitudinal axis. Also, the first and second frustroconical interconnections can extend in the same or different directions along the longitudinal axis. Additionally, whilst FIG. 13B includes the snubber portion 1020 on the first anchor part 110, in some other embodiments, it may be positioned instead on the second anchor part 112. In a further embodiment, snubber portions may be provided on both anchor parts, as described above with reference to FIG. 13A and snubber portions 820 and 920. Additionally, one or more snubber portions may be positioned on each end of the bush 1000 rather than on only one end as shown in FIG. 13B.

FIG. 13C shows a bush 1100 which is a variant of the bush 1000. In the following, a description of the bush 1100 is provided which focusses on the aspects of bush 1100 which differ from the bush 1000. Unless otherwise stated, it is to be understood that the structure and operation of the bush 1100 is the same as the structure and operation of the bush 1000. As shown in FIG. 13C, in the bush 1100, the inertial mass element 818 and the inertial mass element 828 are connected together by an inertial mass connection element indicated by region 1110. The inertial mass connection element may be fabricated from the same material as the inertial mass elements 818 and 828. In an embodiment, the inertial mass element 818, the inertial mass connection element and the inertial mass element 828 are integrally formed, e.g. as a single structural element (e.g. a single piece of metal). However, it is to be understood that in some other embodiments, the inertial mass connection element may be separate from the inertial mass elements 818 and 828, but mechanically fixed to each of the inertial mass elements 818 and 828. In an embodiment, the mechanical fixing may include a bayonet fixing. Alternatively, the inertial mass connection element may be press fitted or crimpled to the inertial mass elements 818 and 828. Furthermore, the inertial mass connection element may be absent and, instead, the inertial mass elements 818 and 828 may be extended along the longitudinal axis so as to contact each other and fix together (e.g. via a bayonet fixing or by crimping/press fitting), so as to essentially form a single part.

In some of the above-described embodiments, the resilient bodies of the bush may have one or more axial passageways or voids extending therethrough. For example, these passageways or voids are shown in FIG. 11C in the resilient bodies 614 and 616. As described above, these axial passageways or voids are through-holes extending completely through the resilient bodies and, as such, these passageways or void are open at both ends. However, it is to be understood that in some alternative embodiments at least one passageway or void may not fully extend through its respective resilient body, i.e. the at least one passageway or void may extend only partly through its respective resilient body. In this case, the passageway or void may instead be referred to as a "pocket". Such pockets may be open at one end and closed by a thin skin (e.g. of resilient material) at the other end. Alternatively, such pockets may be open at both ends and the thin skin may be positioned part way along the passageway. Alternatively, such pockets may be closed at both ends but have the thin skin on both ends so as to define an enclosed void. Therefore, in the above-described embodiments, where a resilient body includes passageways, one or more of such passageways may be either through-holes as described above or pockets as described in this paragraph. Moreover, within a single resilient body, some passageways may be through-holes whilst other passageways may be pockets. In the above-described embodiments, the resilient bodies can be either solid (e.g. resilient body 114 of FIG. 2A) or include axial passageways or voids extending therethrough (e.g. resilient body 514 of FIG. 8A). In some cases, the passageways or voids can include snubber portions (e.g. snubber portion 520 of FIG. 8A). It is to be understood that the resilient bodies, regardless of their precise construction can be either axisymmetric or not. For example, where passageways or voids are present, those passageways or voids can be the same (e.g. have the same dimensions, size and shape) and be uniformly or evenly circumferentially distributed. However, in some other embodiments, a resilient body may be non-axisymmetric, for example, the size and shape of passageways at one circumferential location can be different to passageways at a different circumferential location. In this way, a single resilient body may be softer when loaded on one radial direction compared to when loaded in other radial directions. Another way of achieving a similar result is to make some passageways of a resilient body as through-holes whilst making other passageways of the resilient body as pockets.

The invention claimed is:

1. A bush for isolating vibrations, the bush comprising:
a first anchor part defining a longitudinal axis;
a second anchor part disposed coaxially with respect to the first anchor part;
a first resilient body operably engaged with the first anchor part;
a second resilient body operably engaged with the second anchor part; and
an inertial mass element disposed between the first anchor part and the second anchor part,
wherein the inertial mass element is independently connected to the first resilient body and the second resilient body,
wherein the first resilient body, second resilient body and inertial mass element are arranged to isolate vibrations between the first anchor part and the second anchor part within a predetermined operational frequency range,
wherein the inertial mass element is arranged to isolate the first anchor part and second anchor part from dynamic stiffness increases associated with eigenmodes of the first resilient body and the second resilient body in the predetermined operational frequency range, and
wherein the first resilient body, second resilient body and inertial mass element together form a first frustoconical interconnection between the first anchor part and the second anchor part.

2. A bush according to claim 1, wherein the bush includes one or more snubber portions to physically limit an extent of relative radial movement between the first and second anchor parts.

3. A bush according to claim 2, wherein at least one of the first and second anchor parts includes the snubber portions which physically limit an extent of relative radial movement between the first and second anchor parts.

4. A bush according to claim 1, wherein the inertial mass element comprises a substantially frustroconically-shaped portion.

5. A bush according to claim 4, wherein the inertial mass element comprises a substantially cylindrically-shaped portion extending from, and axially aligned with, the substantially frustroconically-shaped portion.

6. A bush according to claim 1 further comprising:
a third resilient body operably engaged with the first anchor part;
a fourth resilient body operably engaged with the second anchor part; and
a second inertial mass element disposed between the first anchor part and the second anchor part,
wherein the second inertial mass element is independently connected to the third resilient body and the fourth resilient body,
wherein the third resilient body, fourth resilient body and second inertial mass element are arranged to isolate vibrations between the first anchor part and the second anchor part within a predetermined operational frequency range, and
wherein the second inertial mass element is arranged to isolate the first anchor part and second anchor part from dynamic stiffness increases associated with eigenmodes of the third resilient body and the fourth resilient body in the predetermined operational frequency range.

7. A bush according to claim 6, wherein the third resilient body extends away from the first anchor part at a third non-normal angle with respect to the longitudinal axis.

8. A bush according to claim 6, wherein the fourth resilient body extends away from the second anchor part at a fourth non-normal angle with respect to the longitudinal axis.

9. A bush according to claim 6, wherein the third resilient body, fourth resilient body and second inertial mass element together form a second frustoconical interconnection between the first anchor part and the second anchor part.

10. A bush according to claim 9, wherein the first resilient body, second resilient body and inertial mass element together form the first frustoconical interconnection between the first anchor part and the second anchor part, and wherein the first frustoconical interconnection extends away from the first anchor part, and towards the second anchor part, at the same non-normal angle with respect to the longitudinal axis compared to the second frustoconical interconnection.

11. A bush according to claim 9 wherein the first resilient body, second resilient body and inertial mass element together form the first frustoconical interconnection between the first anchor part and the second anchor part, and wherein the first frustoconical interconnection extends away from the first anchor part, and towards the second anchor part, in an opposite direction along the longitudinal axis compared to the second frustoconical interconnection.

12. A bush according to claim 6, wherein at least one of the first and second anchor parts includes snubber portions which physically limit an extent of relative radial movement between the first and second anchor parts, wherein the first resilient body, the second resilient body and the inertial mass element are positioned on one side of the snubber portions, and wherein the third resilient body, the fourth resilient body and the second inertial mass element are positioned on an opposite side of the snubber portions.

13. A bush according to claim 6, wherein at least one of the first and second anchor parts includes snubber portions which physically limit an extent of relative radial movement between the first and second anchor parts, wherein the first resilient body, the second resilient body and the inertial mass element are positioned on one side of the snubber portions, and wherein the third resilient body, the fourth resilient body and the second inertial mass element are positioned on the same side of the snubber portions.

14. A bush according to claim 13, further comprising an inertial mass connection element which is connected on one side to the inertial mass element and on an opposite side to the second inertial mass element so as to form an inertial mass assembly.

15. A bush according to claim 1, wherein the first anchor part is a rod extending along the longitudinal axis, and wherein the second anchor part is a sleeve surrounding the rod.

16. A bush according to claim 15, wherein the inertial mass element is a rigid tubular body disposed coaxially with respect to the rod in between the rod and the sleeve.

17. A bush according to claim 16, wherein the first resilient body extends radially between an outer surface of the rod and an inner surface of the rigid tubular body, and the second resilient body extends radially between an outer surface of the rigid tubular body and an inner surface of the sleeve.

18. A bush according to claim 1, wherein the first anchor part is connectable to a first machine component and the second anchor part is connectable to a second machine component, whereby the bush is operable to isolate vibrations between the first machine component and second machine component.

19. A bush according to claim 18, wherein the first machine component and second machine component are an engine and a chassis of a vehicle.

20. A bush according to claim 1, wherein the first resilient body extends away from the first anchor part at a first non-normal angle with respect to the longitudinal axis.

21. A bush according to claim 1, wherein the second resilient body extends away from the second anchor part at a second non-normal angle with respect to the longitudinal axis.

* * * * *